(12) United States Patent
Yamasaki et al.

(10) Patent No.: US 10,089,873 B2
(45) Date of Patent: Oct. 2, 2018

(54) VEHICLE TRAVEL ROUTE CONTROL SYSTEM AND FLEET MANAGEMENT SERVER

(71) Applicant: HITACHI CONSTRUCTION MACHINERY CO., LTD., Tokyo (JP)

(72) Inventors: Ryota Yamasaki, Tokyo (JP); Yoshinori Ookura, Tokyo (JP); Tomoyuki Hamada, Tsuchiura (JP); Tsutomu Yamada, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 37 days.

(21) Appl. No.: 14/917,349

(22) PCT Filed: Dec. 25, 2014

(86) PCT No.: PCT/JP2014/084395
§ 371 (c)(1),
(2) Date: Mar. 8, 2016

(87) PCT Pub. No.: WO2015/145908
PCT Pub. Date: Oct. 1, 2015

(65) Prior Publication Data
US 2016/0217690 A1    Jul. 28, 2016

(30) Foreign Application Priority Data

Mar. 27, 2014    (JP) .................................. 2014-066879

(51) Int. Cl.
*G08G 1/16*    (2006.01)
*E02F 9/20*    (2006.01)
(Continued)

(52) U.S. Cl.
CPC ............. *G08G 1/161* (2013.01); *E02F 9/205* (2013.01); *E02F 9/2045* (2013.01);
(Continued)

(58) Field of Classification Search
None
See application file for complete search history.

(56) References Cited

U.S. PATENT DOCUMENTS 3,483,829 A * 12/1969 Barry ..................... B60K 1/00
104/18
4,858,859 A * 8/1989 Apperson ............... B61L 23/24
246/20
(Continued)

FOREIGN PATENT DOCUMENTS

| JP | 2000-339028 A | 12/2000 |
| JP | 2001-141469 A | 5/2001 |
| WO | 98/37468 A1 | 8/1998 |

OTHER PUBLICATIONS

International Search Report of PCT/JP2014/084395 dated Mar. 24, 2015.

*Primary Examiner* — Nicholas K Wiltey
(74) *Attorney, Agent, or Firm* — Mattingly & Malur, PC

(57) ABSTRACT

To provide a technology that enables dump trucks to travel smoothly even in a mine where electromagnetic wave conditions are bad. The invention is a vehicle travel system in which haulage vehicles 20 traveling in a premise of a mine along predetermined travel routes 60 and a fleet management server for managing operations of haulage vehicles are connected in communication together via wireless communication network and that sets a travel-permitted segment n+1 so that difference between a communication timing at which the haulage vehicle 20-1 transmits permission request information to the fleet management server from a provisional permission-requesting point RP and communication timing at which other haulage vehicle transmits the permission request information to the same wireless base station may become more than or equal to a predetermined threshold value.

8 Claims, 16 Drawing Sheets

(51) Int. Cl.
*H04W 4/04* (2009.01)
*G05D 1/02* (2006.01)
*H04L 29/08* (2006.01)
*G08G 1/00* (2006.01)

(52) U.S. Cl.
CPC ......... *E02F 9/2054* (2013.01); *G05D 1/0297* (2013.01); *G08G 1/20* (2013.01); *H04L 67/12* (2013.01); *H04W 4/046* (2013.01); *G05D 2201/0202* (2013.01)

(56) References Cited

U.S. PATENT DOCUMENTS

| | | | | |
|---|---|---|---|---|
| 5,623,413 | A * | 4/1997 | Matheson | B61L 27/0016 104/307 |
| 5,646,844 | A * | 7/1997 | Gudat | E01C 19/004 701/409 |
| 6,246,956 | B1 * | 6/2001 | Miyoshi | B61L 23/16 246/182 R |
| 6,418,854 | B1 * | 7/2002 | Kraft | B61L 17/00 104/26.1 |
| 6,668,157 | B1 * | 12/2003 | Takeda | H04B 7/155 455/11.1 |
| 6,980,894 | B1 * | 12/2005 | Gordon | B60L 3/0015 104/299 |
| 7,549,610 | B1 * | 6/2009 | Ireland | A63H 19/24 246/1 C |
| 7,778,213 | B2 * | 8/2010 | Alrabady | H04W 76/002 370/312 |
| 7,835,712 | B1 * | 11/2010 | Shi | H04W 48/16 455/161.1 |
| 8,103,438 | B2 * | 1/2012 | Petrie | B60T 7/22 340/905 |
| 8,144,000 | B2 * | 3/2012 | Darby, Jr. | G06Q 10/0635 340/435 |
| 8,170,785 | B2 * | 5/2012 | Diekhans | G01C 21/20 172/102 |
| 8,386,134 | B2 * | 2/2013 | Morey | G01G 19/10 172/430 |
| 8,520,695 | B1 * | 8/2013 | Rubin | G08G 9/02 370/337 |
| 8,538,608 | B2 * | 9/2013 | Meltser | B61C 17/12 246/187 C |
| 8,702,043 | B2 * | 4/2014 | Daum | B61L 3/20 246/167 R |
| 8,755,936 | B2 * | 6/2014 | Friedman | G08C 17/00 700/248 |
| 8,838,268 | B2 * | 9/2014 | Friedman | A47L 9/009 700/245 |
| 8,862,390 | B2 * | 10/2014 | Sugawara | E02F 9/26 701/431 |
| 8,892,256 | B2 * | 11/2014 | Friedman | A47L 9/009 700/245 |
| 8,935,059 | B2 * | 1/2015 | Blank | A01B 79/005 701/30.3 |
| 8,977,414 | B2 * | 3/2015 | Yamada | B60L 15/40 701/20 |
| 9,195,402 | B1 * | 11/2015 | Hostetter | G06F 3/061 |
| 9,244,464 | B2 * | 1/2016 | Kini | G05D 1/0297 |
| 9,605,415 | B2 * | 3/2017 | Edara | E02F 9/267 |
| 9,672,743 | B2 * | 6/2017 | Hamada | G08G 1/164 |
| 2004/0267415 | A1 * | 12/2004 | Lacote | B61L 23/34 701/19 |
| 2007/0014532 | A1 * | 1/2007 | Parisi | A63H 19/32 386/343 |
| 2007/0192668 | A1 * | 8/2007 | Hrebek | B61L 3/127 714/781 |
| 2007/0225019 | A1 * | 9/2007 | Knox | H04L 45/56 455/461 |
| 2008/0071435 | A1 * | 3/2008 | Katzer | A63H 19/24 701/20 |
| 2010/0191395 | A1 * | 7/2010 | Rosenkranz | B61L 3/125 701/19 |
| 2011/0061558 | A1 * | 3/2011 | Crawford | A63G 7/00 104/53 |
| 2011/0098908 | A1 * | 4/2011 | Chun | B61B 1/00 701/117 |
| 2011/0218833 | A1 * | 9/2011 | Boss | G06Q 10/047 705/7.26 |
| 2011/0218835 | A1 * | 9/2011 | Boss | G06Q 10/06316 705/7.26 |
| 2012/0095626 | A1 * | 4/2012 | Smith | B61L 15/0027 701/19 |
| 2012/0315894 | A1 * | 12/2012 | Dussmann | H04B 7/15528 455/424 |
| 2013/0146719 | A1 * | 6/2013 | Yoon | B61L 27/0005 246/122 R |
| 2013/0249280 | A1 * | 9/2013 | Goodermuth | B60L 11/02 307/9.1 |
| 2014/0103166 | A1 * | 4/2014 | Asuka | B61L 23/24 246/4 |
| 2014/0209758 | A1 * | 7/2014 | Kurita | B60L 15/40 246/2 S |
| 2014/0232191 | A1 * | 8/2014 | Doelling | B60M 3/04 307/42 |
| 2014/0323139 | A1 * | 10/2014 | Lee | H04W 16/06 455/447 |
| 2015/0025717 | A1 * | 1/2015 | Smith | B61L 15/0027 701/19 |
| 2015/0065146 | A1 * | 3/2015 | Wenger | H04W 36/32 455/440 |
| 2015/0066962 | A1 * | 3/2015 | Cortes | G06F 17/3056 707/755 |
| 2015/0142225 | A1 * | 5/2015 | Tonguz | B61L 19/06 701/19 |
| 2015/0193030 | A1 * | 7/2015 | Grover | B60K 37/06 701/36 |
| 2015/0221222 | A1 * | 8/2015 | Hamada | G05D 1/0297 701/2 |
| 2015/0225003 | A1 * | 8/2015 | Morton | B61L 3/121 701/19 |
| 2015/0239481 | A1 * | 8/2015 | Dymek | B61L 15/0027 701/19 |
| 2015/0276416 | A1 * | 10/2015 | Yamasaki | H04W 4/046 701/537 |
| 2016/0016598 | A1 * | 1/2016 | Li | B61L 15/0018 246/28 R |
| 2016/0202698 | A1 * | 7/2016 | Yamasaki | B60L 1/003 701/2 |

* cited by examiner

FIG. 5

| 501 | 502 | 503 | 504 | 505 | 506 |
|---|---|---|---|---|---|
| DUMP TRUCK ID | FRONT BOUNDARY POINT INFORMATION | REAR BOUNDARY POINT INFORMATION | PERMISSION-REQUESTING POINT INFORMATION | SPEED LIMIT | ASSUMED COMMUNICATION TIMING |
| ... | ... | ... | ... | ... | ... |
| $a_{n-1}$ | $b_{n-1}$ | $c_{n-1}$ | $d_{n-1}$ | $e_{n-1}$ | $f_{n-1}$ |
| $a_n$ | $b_n$ | $c_n$ | $d_n$ | $e_n$ | $f_n$ |
| $a_{n+1}$ | $b_{n+1}$ | $c_{n+1}$ | $d_{n+1}$ | $e_{n+1}$ | $f_{n+1}$ |
| ... | ... | ... | ... | ... | ... |

500

FIG. 6
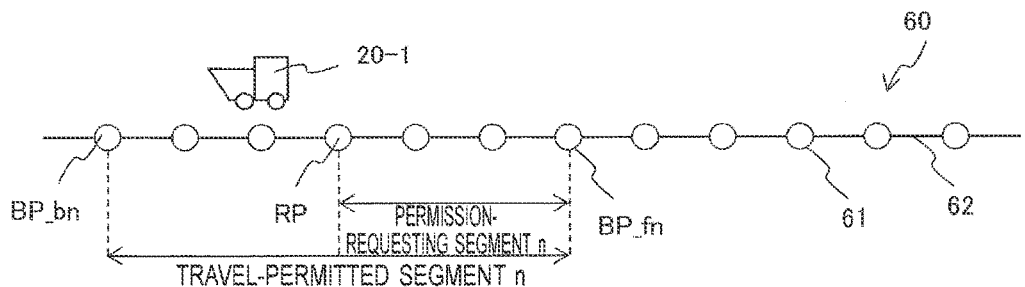
(a)
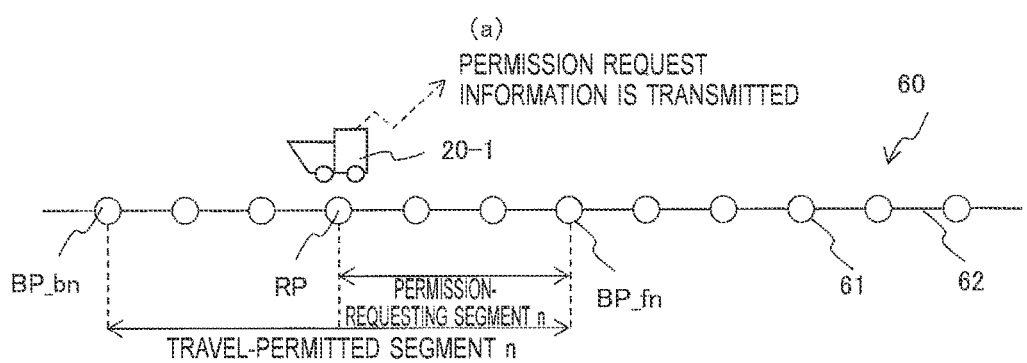
(b)
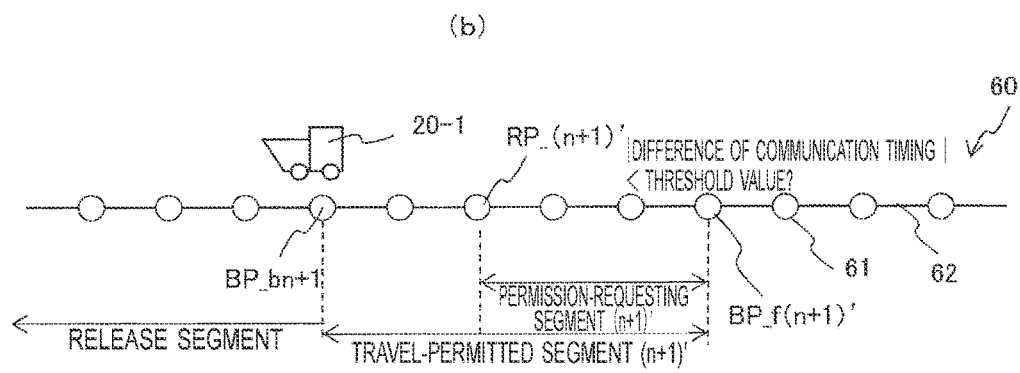
(c)
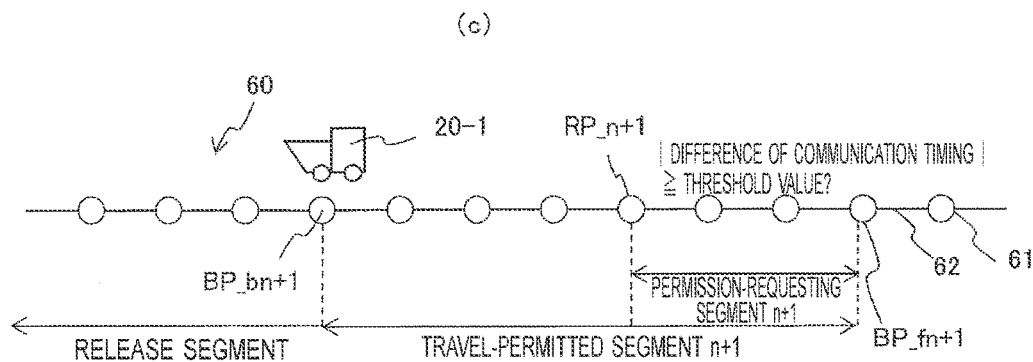
(d)

FIG. 13
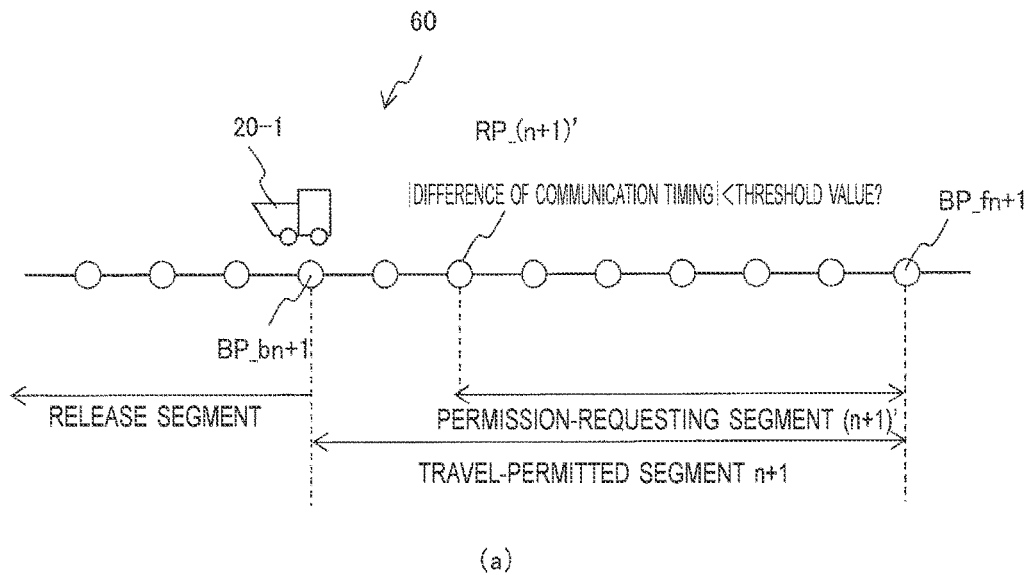
(a)
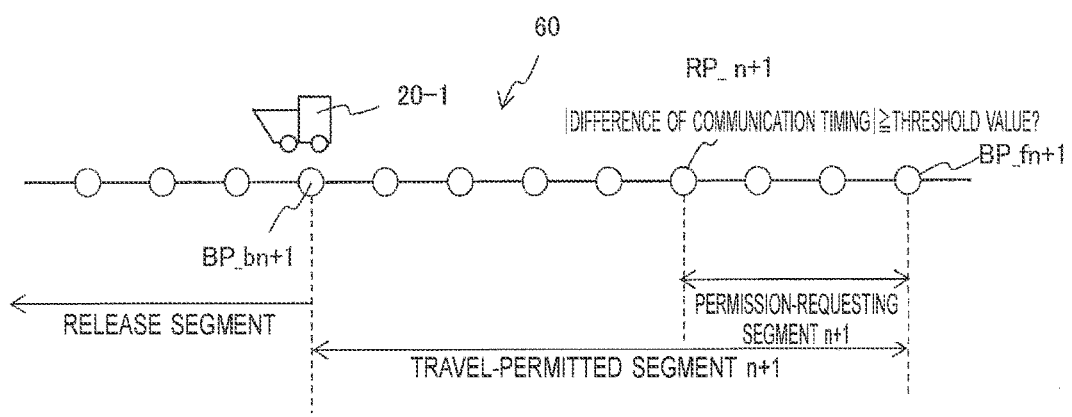
(b)

FIG. 16

| BASE STATION ID | DUMP TRUCK ID | FRONT BOUNDARY POINT INFORMATION | REAR BOUNDARY POINT INFORMATION | PERMISSION-REQUESTING POINT INFORMATION | SPEED LIMIT | ASSUMED COMMUNICATION TIMING | FREQUENCY CHANNEL |
|---|---|---|---|---|---|---|---|
| ... | ... | ... | ... | ... | ... | ... | ... |
| $Y_{n-1}$ | $a_{n-1}$ | $b_{n-1}$ | $c_{n-1}$ | $d_{n-1}$ | $e_{n-1}$ | $f_{n-1}$ | 1ch |
| $Y_n$ | $a_n$ | $b_n$ | $c_n$ | $d_n$ | $e_n$ | $f_n$ | 1ch |
| $Y_{n+1}$ | $a_{n+1}$ | $b_{n+1}$ | $c_{n+1}$ | $d_{n+1}$ | $e_{n+1}$ | $f_{n+1}$ | 2ch |
| ... | ... | ... | ... | ... | ... | ... | ... |

VEHICLE TRAVEL ROUTE CONTROL SYSTEM AND FLEET MANAGEMENT SERVER

TECHNICAL FIELD

The present invention relates to a vehicle travel control system for mine and a fleet management server and, more specifically, to a technology of improving a connection state of wireless communication network at the time of multiple haulage vehicles traveling.

BACKGROUND ART

In mines, haulage vehicles that travel autonomously without an operator on board, especially dump trucks, may be used. Such autonomous traveling dump trucks for mine acquire directions from a control center through the wireless communication network, and travel according to them. Therefore, in order for dump trucks for mine to be operated smoothly, it is required to improve reliability of wireless communication between the dump trucks and a wireless base station.

As a technology for improving the reliability of the wireless communication between the dump trucks for mine and the wireless base station, a technology described in Patent Literature 1 is well known. In the system described in Patent Literature 1, movable stations, such as multiple mine dump trucks traveling in travel routes, have identification information, and when the data corresponding to the identification information that a supervisory station manages and data that a certain movable station retains do not agree with each other, the moveable station requests a transmission request of data to the supervisory station. Thereby, as compared with communication modes (communication mode where all the data are transmitted and received each time), such as point-to-point communication and broadcast communication, a communication load can be reduced.

CITATION LIST

Patent Literature

Patent literature 1: U.S. Pat. No. 6,668,157

SUMMARY OF INVENTION

Technical Problem

In the mine, while multiple autonomous traveling dump trucks travel, the wireless base stations are arranged scatteredly so that the communication areas of the wireless base stations may cover the whole travel routes of the dump trucks for mine.

In a situation where the multiple dump trucks are traveling on the travel routes, communication timings from the multiple dump trucks may overlap to a single wireless base station. There is a problem that concentration of communication timings becomes a cause of delay in acquisition of an instruction about travel from the control center for the dump truck, which leads to stop of the dump truck and consequently lowering of productivity of the whole mine. Moreover, there is a problem for the control center that requests from the dump trucks concentrate and a load of a server of the control center is temporarily raised high.

In the above-mentioned Patent Literature 1, since the control center transmits and receives data identification information and, if there is history in the information, uses last data, a data amount that is transmitted and received can be reduced as compared a common communication mode where the whole data is transmitted/received every time. However, this scheme does not consider overlapping of transmission/reception timings of the data identification information and the whole data in the case of no data identification information. Therefore, if timings of data communication overlap, congestion of the wireless base stations cannot be resolved still, which means that the above-mentioned problem attendant on it is not solved.

The present invention is made in consideration of the above-mentioned problem and has an object of resolving communication congestion of wireless base stations when multiple haulage vehicles are traveling in the vehicle travel control system for mine.

Solution to Problem

In order to solve the above-mentioned problems, the present invention is a vehicle travel control system in which multiple haulage vehicles traveling along predetermined travel routes in a premise of a mine and a fleet management server for managing operations of these multiple haulage vehicles are connected in communication via wireless base stations, and that has: a travel-permitted segment setting unit that sets a partial segment on the travel routes as a travel-permitted segment where each haulage vehicle is permitted to travel for each of the multiple haulage vehicles and calculates a permission-requesting point that is in the travel-permitted segment and is a point to transmit permission request information for requesting setting of a next travel-permitted segment located in front of the travel-permitted segment; a communication timing calculation unit for calculating a communication timing at which the permission request information is transmitted from the each haulage vehicle to the fleet management server via the wireless base station; and a communication timing determination unit for determining whether difference between a communication timing at which one haulage vehicle among the multiple haulage vehicles transmits the permission request information and communication timings at which other haulage vehicle among the multiple haulage vehicles transmits the permission request information to the same wireless base station is more than or equal to a predetermined threshold value, and is characterized in that the travel-permitted segment setting unit temporarily sets the travel-permitted segment to the one haulage vehicle, and calculates a provisional permission-requesting point corresponding to the temporarily set travel-permitted segment, the communication timing calculation unit calculates a communication timing at which the permission request information is transmitted from the provisional permission-requesting point, the communication timing determination unit determines whether the differences between the communication timing at which the one haulage vehicle transmits the permission request information from the provisional permission-requesting point and the communication timings at which the other haulage vehicles transmit the permission request information are more than or equal to the predetermined threshold value, and the travel-permitted segment setting unit sets the temporarily set travel-permitted segment as a normal travel-permitted segment if the difference of the communication timings is more than or equal to the predetermined threshold value.

According to the present invention, when setting the travel-permitted segment of the each haulage vehicle, the travel-permitted segment setting unit temporarily sets the travel-permitted segment first, and calculates the provisional permission-requesting point. Then the communication timing calculation unit calculates the communication timing at which the permission request information is transmitted from the provisional permission-requesting point and the communication timing determination unit determines whether the differences between the calculated communication timing and the communication timings at which the other haulage vehicles transmit the permission request information are more than or equal to the predetermined threshold value. Since the travel-permitted segment setting unit normally sets the travel-permitted segment when the differences of communication timings are more than or equal to the predetermined threshold value, it can set the travel-permitted seyment so that the communication timings of the haulage vehicles may be dispersed.

Moreover, in the present invention with the above-mentioned configuration, the travel-permitted segment setting unit is characterized in the following operations: temporarily setting the front boundary point that is a front end part of the travel-permitted segment to the one haulage vehicle; calculating the provisional permission-requesting point according to predetermined conditions on the basis of the front boundary point; when the differences between the communication timing at which the permission request information is transmitted from the provisional permission-requesting point and the communication timings at which the other haulage vehicles transmit the permission request information are less than the predetermined threshold value, temporarily setting a point that is different from the temporarily set front boundary point as a new front boundary point again; calculating a new provisional permission-requesting point according to the predetermined conditions on the basis of the temporarily set front boundary point again; and when the differences between the communication timing at which the one haulage vehicle transmits the permission request information from the new provisional permission-requesting point and the communication timings of the other haulage vehicles are more than or equal to the predetermined threshold value, setting a partial segment that incorporates the temporarily set front boundary point again as its front end part as a normal travel-permitted segment.

According to the present invention, when the differences between the communication timing of the provisional permission-requesting point on the basis of the temporarily set front boundary point and communication timings of other haulage vehicles are less than the predetermined threshold value, the front boundary point is shifted. In following this, the provisional permission-requesting point is also shifted. Then when the communication timing at the new provisional permission-requesting point deviates from the communication timings of the other haulage vehicles by the predetermined threshold value, the travel-permitted segment corresponding to the permission-requesting point can be normally set. Thereby, the travel-permitted segment can be set so that the communication timings of the multiple haulage vehicles may be dispersed while the permission-requesting point is set with a distance from the front boundary point kept constant.

Moreover, the present invention with the above-mentioned configuration is characterized in that the travel-permitted segment setting unit temporarily sets the front boundary point that is a front end part of the travel-permitted segment and the rear boundary point that is a rear end part thereof to the one haulage vehicle, calculates the provisional permission-requesting point on the basis of either of the front boundary point or the rear boundary point being temporarily set, calculates a point that exists between the front boundary point and the rear boundary point being temporarily set and is different from the provisional permission-requesting point as the new provisional permission-requesting point when the differences between the communication timing at which the permission request information is transmitted from the provisional permission-requesting point and communication timings at which the other haulage vehicles transmit the permission request information are less than the predetermined threshold value, and sets a partial segment between the front boundary point and the rear boundary point being temporarily set as a normal travel-permitted segment when the differences between the communication timing at which the one haulage vehicle transmits the permission request information from the provisional permission-requesting point being calculated again and the communication timings of the other haulage vehicles are more than or equal to the predetermined threshold value.

According to the present invention, without changing the position of the front boundary point, the permission-requesting point can be set so that communication timing may be dispersed. Thereby, even in the case where other haulage vehicles travel ahead the haulage vehicle, it is possible to set the travel-permitted segment while keeping a connection condition good without interference with the haulage vehicles ahead.

Moreover, the present invention in the above-mentioned configuration is characterized in that when multiple adjacent wireless base stations use the same frequency, the travel-permitted segment setting unit temporarily sets the travel-permitted segment overriding the communication areas of the multiple adjacent wireless base stations.

According to the present invention, with the same frequency, the travel-permitted segment is extensible to the adjacent communication area. Therefore, a degree of freedom when setting the travel-permitted segment with the communication timing shifted raises, and the number of times of transmission of the permission request information decreases because the length of one travel-permitted segment becomes longer, which leads to improvement of a communication status.

Moreover, in the above-mentioned configuration, the present invention is characterized in that the communication timing calculation unit calculates the communication timing based on a current position and a traveling speed of each haulage vehicle.

According to the present invention, the communication timing can be calculated according to a real-time travel state of the each haulage vehicle.

Moreover, the present invention is a fleet management server that is connected in communication with multiple haulage vehicles traveling in a premise of a mine along the predetermined travel routes via the wireless base stations, and has: a travel-permitted segment setting unit that sets a partial segment on the travel routes as a travel-permitted segment in which each haulage vehicle is permitted to travel for each of the multiple haulage vehicles and calculates the permission-requesting point that is in the travel-permitted segment and is a point to transmit the permission request information for requesting setting of the next travel-permitted segment located in front of the travel-permitted segment; the communication timing calculation unit for calculating a communication timing at which the permission request information is transmitted from the each haulage vehicle to the fleet management server via the wireless base station, the communication timing determination unit for determining whether the difference between a communication timing at which one haulage vehicle among the multiple haulage vehicles transmits the permission request information and communication timing at which the other haulage vehicle of the multiple haulage vehicles transmits the permission request information to the same wireless base station is more than or equal to a predetermined threshold value, and the server-side communication control unit that transmits the permission response information showing the travel-permitted segment that the travel-permitted segment setting unit set to the each haulage vehicle, in which the travel-permitted segment setting unit temporarily sets the travel-permitted segment to the one haulage vehicle and calculates the provisional permission-requesting point corresponding to the temporarily set travel-permitted segment, the communication timing calculation unit calculates the communication timing at which the permission request information is transmitted from the provisional permission-requesting point, the communication timing determination unit determines whether the difference between the communication timing at which the one haulage vehicle transmits the permission request information from the provisional permission-requesting point and the communication timing at which the other haulage vehicles transmits the permission request information is more than or equal to the predetermined threshold value, and the travel-permitted segment setting unit sets the temporarily set travel-permitted segment as a normal travel-permitted segment when the difference of the communication timings is more than or equal to the predetermined threshold value.

According to the present invention, at the time of setting the travel-permitted segment of the each haulage vehicle, the provisional permission-requesting point is calculated after the travel-permitted segment setting unit temporarily sets the travel-permitted segment. Then the communication timing calculation unit calculates the communication timing at which the permission request information is transmitted from the provisional permission-requesting point and the communication timing determination unit determines whether the difference between the calculated communication timing and the communication timing at which the other haulage vehicle transmits the permission request information is more than or equal to a predetermined threshold value. Since the travel-permitted segment setting unit normally sets the travel-permitted segment when the differences of communication timings are more than or equal to the predetermined threshold value, it can set the travel-permitted segment while dispersing the communication timing of the each haulage vehicle.

Advantageous Effects of Invention

According to the present invention, in the vehicle travel control system for mine, it is possible to resolve communication congestion of the wireless base station when multiple haulage vehicles are traveling. Incidentally, configuration etc. other than this will be clarified by the embodiments.

BRIEF DESCRIPTION OF DRAWINGS

FIG. 4 are diagrams showing a configuration of an information format transmitted and received between the fleet management server and an autonomous traveling dump truck, in which
FIG. 5 is a diagram showing communication timing information.
FIG. 6 are diagrams showing the setting processing of the travel-permitted segment in the vehicle travel control system according to this embodiment, in which FIG. 6 (a) shows a state where the dump truck travels in a travel-permitted segment n, FIG. 6 (b) shows a state where the dump truck arrives at the permission-requesting point,
FIG. 6(c) shows a release segment and a setting state of a first front boundary point, and FIG. 6 (d) shows a setting state of the next front boundary point.
FIG. 13 are diagrams showing the setting processing of the travel-permitted segment in the second embodiment, in which FIG. 13 (a) shows a case where differences of the communication timings of the permission-requesting point are less than a threshold value and FIG. 13 (b) shows a state where the differences of a temporarily set permission-requesting point are more than or equal to the threshold value.
FIG. 16 shows a communication timing information table configuration that the fleet management server retains in the third embodiment.

DESCRIPTION OF EMBODIMENTS

Figure 1:
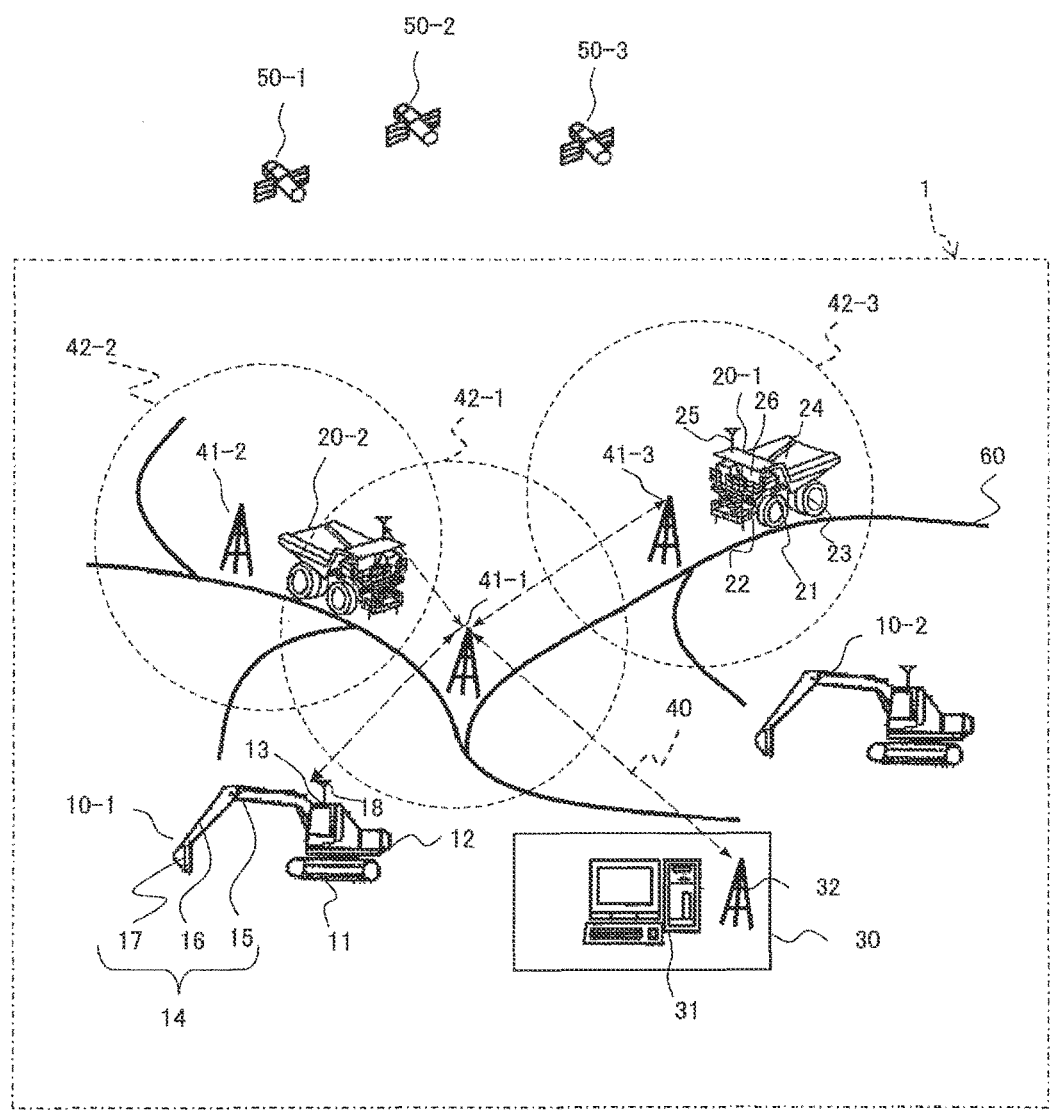
FIG. 1 is a diagram showing a schematic configuration of a vehicle travel control system according to a first embodiment.

In the following embodiments, when there is necessity for convenience, an explanation is given with the embodiment divided into multiple sections or multiple embodiments. In the following embodiments, when mentioning the number of elements (including an individual number, a numerical value, a quantity, a range, etc.) the number is not limited to the specific number and the number may be more than or equal to the number and may be less than or equal to the number except for the case where it is stated clearly in particular and the case where it is considered to be clearly limited to a specific number theoretically. Incidentally, in the following embodiments, the component (including a processing step etc.) is not necessarily essential except for the case where it is stated clearly in particular and the case where it is considered clearly essential.

Moreover, regarding each configuration, function, processing unit, processing means, etc. in the embodiments below, a part or the whole of them may be realized as hardware, for example, as an integrated circuit or other circuits. Moreover, each configuration, function, processing unit, processing means, etc. that will be described later may be realized as a program that is executed on a computer. That is, they may be realized as software. Information of programs, tables, files, etc. that realize the each configuration, function, processing unit, processing means, etc. can be stored in storage devices, such as memory, a hard disk, and an SSD (Solid State Drive), and in storage media, such as an IC card, an SD card, and DVD.

Hereinafter, embodiments of the present invention are described in detail based on drawings. Incidentally, in all the diagrams for explaining embodiments, the same or related reference numeral is given to a member having the same function and its repeated explanation is omitted. Moreover, in the following embodiments, an explanation of the same or similar portion is not repeated as a rule except for a case where it is specially required.

First Embodiment

[System Configuration]

A first embodiment relates to a vehicle travel control system in which haulage vehicles for conveying soil and ore that are loaded by loading machines, such as excavators and wheel loaders, in a mine, and a control center for controlling positions and travel states of the loading machines and the haulage vehicles are connected via a wireless communication network and is especially characterized by deciding travel segments of the haulage vehicles in consideration of communication timings of a base station of wireless communication. Hereinafter, the vehicle travel control system according to the first embodiment of the present invention is explained referring to drawings. Moreover, in the following embodiment, although explanation is given using dump trucks as an example of haulage vehicles, the haulage vehicles are not limited to the dump trucks.

First, the schematic configuration of the vehicle travel control system according to the first embodiment is explained based on FIG. 1. FIG. 1 is a diagram showing the schematic configuration of the vehicle travel control system according to the first embodiment. The vehicle travel control system 1 shown in FIG. 1 includes excavators 10-1, 10-2 for performing loading operations of soil and ore in quarries of mines and etc., the dump trucks 20-1, 20-2 for conveying cargos of soils, ores, etc., and a fleet management server 31 installed in a control center 30 in the neighborhood of or away from the quarry.

Each of the dump trucks 20-1, 20-2 makes a round trip between the excavator 10-1 or 10-2 and an unillustrated dumping site and conveys a cargo along travel routes 60 set in advance in the mine. In this embodiment, although the explanation is given taking un-manned dump trucks that perform autonomous traveling with no operators on board for dump trucks 20-1, 20-2 as an example, the present invention can be applied even in the case of manned dump trucks with the operators on board to drive.

The excavators 10-1, 10-2, the dump trucks 20-1, 20-2, and the fleet management server 31 are mutually connected in communication via wireless communication network 40. In order to perform this wireless communication connection smoothly, multiple wireless base stations 41-1, 41-2, and 41-3 are installed in the mine. Then a radio wave of wireless communication is transmitted and received via these base stations. The radio wave attenuates as a distance from each of the base stations 41-1, 41-2, and 41-3 is separated. Reference numerals 42-1, 42-2, and 42-3 of FIG. 1 show respective range (hereinafter referred to as a "communication area") in which each of the base stations 41-1, 41-2, and 41-3, and each of the dump trucks 20-1, 20-2 can transmit and receives the radio wave. It is desirable to enable the dump trucks 20-1, 20-2 to make connection to the wireless communication network 40 from any point as long as the dump truck is on the travel routes 60 by installing the base stations 41-1, 41-2, and 41-3 so that the communication areas 42-1, 42-2, and 42-3 may overlap one another. In FIG. 1, although the communication areas are illustrated circularly, in fact, there is case where the area does not become circular due to being affected by geographical features.

The excavators 10-1, 10-2 and the dump trucks 20-1, 20-2 each have a position calculating system (illustration is omitted in FIG. 1) for acquiring a position of an own vehicle by receiving the positioning radio waves from at least three navigation satellites 50-1, 50-2, and 50-3 of the global navigation satellite system (GNSS). Hereinafter, although the excavators 10-1, 10-2 and the dump trucks 20-1, 20-2 are each explained, since the excavator 10-1 and the excavator 10-2 have the same configuration and the dump truck 20-1 and the dump truck 20-2 have the same configuration, respectively, the excavator 10-1 and the dump truck 20-1 are explained, and explanations about the excavator 10-2 and the dump truck 20-2 are omitted.

The excavator 10-1 is a super large-sized hydraulic excavator, and is configured by including a travel base 11, a revolving upperstructure 12 provided on this travel base 11 so as to be capable of revolution, a cab 13, and a front working mechanism 14 provided in the center of the front part of the revolving upperstructure 12. The front working mechanism 14 includes a boom 15 provided to the revolving upperstructure 12 so as to be capable of elevation, an arm 16 provided at the top end of this boom 15 so as to be capable of rotary motion, and a bucket 17 attached at the top end of the arm 16. On a place of good visibility in the excavator 10-1, for example, on the upper part of the cab 13, an antenna 18 for connecting to the wireless communication network is installed.

The dump truck 20-1 includes a body frame 21 forming a main body, front wheels 22 and rear wheels 23, a body 24 capable of rotary motion vertically using a hinge pin (unillustrated) provided in the rear part of the frame 21 as a rotation center, and a hoist cylinder (unillustrated) consisting of one pair of right part and left part for making this body 24 rotate vertically. Moreover, an antenna 25 for connecting the dump truck 20-1 to the wireless communication network 40 is installed at a place of good visibility, for example, on the front part of the upper surface of the dump truck 20-1.

Furthermore, on-board terminal equipment 26 for performing the autonomous traveling according to an instruction from the fleet management server 31 is installed on the dump truck 20-1.

The fleet management server 31 is connected to an antenna 32 for connecting to the wireless communication network 40. Then the fleet management server 31 communicates with each of the excavators 10-1, 10-2 and the dump trucks 20-1, 20-2 via the antenna 32 and the wireless base stations 41-4, 41-2, and 41-3.

Figure 2:
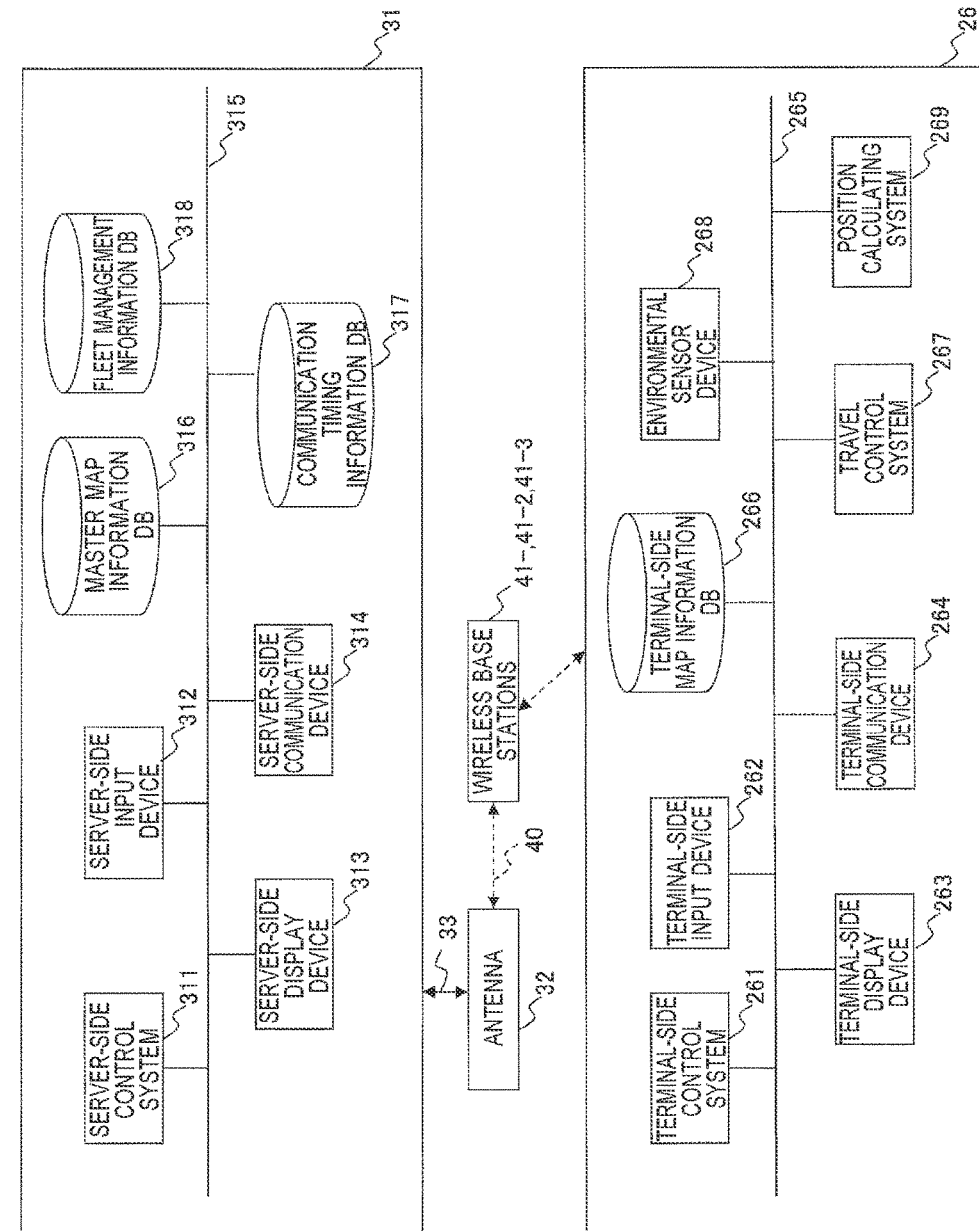
FIG. 2 is a hardware configuration diagram of a fleet management server and on-board terminal equipment.

Next, by referring to FIG. 2, hardware configurations of the fleet management server 31 and the on-board terminal equipment 26 of FIG. 1 are explained. FIG. 2 is the hardware configuration diagram of the fleet management server and the on-board terminal equipment.

As shown in FIG. 2, the fleet management server 31 is configured by including a server-side control system 311, a server-side input device 312, a server-side display device 313, a server-side communication device 314, a communication bus 315, a master map information database (hereinafter abbreviated as a "DB") 316, a communication timing information DB 317, and a fleet management information DB 318.

The server-side control system 311 controls respective operations of the components of the fleet management server 31, and is configured by including: hardware including an arithmetic and control unit, such as a CPU (Central Processing Unit), and storage devices, such as ROM (Read Only Memory), RAM (Random Access Memory), and an HDD (Hard Disk Drive); and software that is executed by the server-side control system 311. By these pieces of hardware executing software, functions of the fleet management server 31 are realized.

The server-side input device 312 is configured with input devices, such as a mouse and a keyboard, and functions as an interface for accepting an input operation from the operator.

The server-side display device 313 is configured with a liquid crystal display monitor etc., and functions as an interface for displaying and presenting information to an operator.

The server-side communication device 314 may use wireless communication equipment that conforms standards of Wi-Fi (Wireless Fidelity) and IEEE (Institute of Electrical and Electronics Engineers) 802.11.

The communication bus 315 electrically connects components to each other.

A master map information DB 316 is configured by using a storage device for storing fixedly, such as an HDD, and stores travel routes information that is defined by position information of positions on the travel routes 60 (hereinafter referred to as "nodes") and sub links that connect the nodes. Moreover, the master map information DB 316 may include geographical features information of the mine, and absolute coordinates (three-dimensional real coordinates calculated based on a positioning radio wave) of each node. The each node is given position identification information (hereinafter referred to as a "node ID") for inherently identifying the node.

The communication timing information DB 317 is configured by using a storage device for storing fixedly, such as an HDD, and stores information showing the communication timing (hereinafter referred to as "communication timing information") for each of the wireless base stations 41-1, 41-2, and 41-3.

The fleet management information DB 318 is configured by using a storage device that stores fixedly, such as an HDD, and stores operation information of the dump truck, such as a current position and a traveling speed of each dump truck.

The fleet management server 31 is connected with the antenna 32 through wire communication lines 33, and is connected with the wireless base stations 41-1, 41-2, and 41-3 through the wireless communication network 40. Incidentally, each of the above-mentioned databases may have only a storage unit for storing master map information, the communication timing information, and fleet management information while the server-side control system 311 may perform updating and retrieval processing of these databases, or each database may be one that is provided with an engine for performing updating and retrieval processing of the information of the above-mentioned storage unit. The same may be applied to various databases that will be described later.

Next, the on-board terminal equipment 26 on board of the dump truck 20-1 is configured by including a terminal-side control system 261, a terminal-side input device 262, a terminal-side display device 263, a terminal-side communication device 264, a communication bus 265, a terminal-side map information DB 266, a travel control system 267, an environmental sensor device 268, and a position calculating system 269.

The terminal-side control system 261 controls an operation of each component of the on-board terminal equipment 26, and is configured by having hardware including an arithmetic and control device of a CPU etc., and storage devices of ROM, RAM, an HDD, etc. and software executed by the server-side control system 311. By these pieces of the hardware executing the software, respective functions of the on-board terminal equipment 26 are realized.

The terminal-side input device 262 is configured with input devices, such as a touch panel and various switches, and functions as an interface for accepting the input operation from the operator.

The terminal-side display device 263 is configured with a liquid crystal display monitor etc., and functions as an interface for displaying and presenting information to the operator.

The terminal-side communication device 264 may also use the wireless communication equipment that is a general-purpose article that conforms to standards of Wi-Fi and IEEE802.11.

The communication bus 265 electrically connects components to each other.

The terminal-side map information DB 266 is configured by using a storage device for storing fixedly, such as an HDD, and stores the same map information as map information stored in the master map information DB 316.

The travel control system 267 is a control system for instructing an acceleration/deceleration amount, a control amount, and a steering angle to driving units relating to travel of the dump truck 20-1 (hereinafter referred to as "travel drive units"), such as an acceleration/deceleration unit, a control unit, and a steering unit.

The environmental sensor device 268 is a sensor for detecting an obstacle in front of the dump truck 20-1 in a traveling direction of it (a running direction), such as a millimeter wave radar and a front camera, etc. and its type is out of the question. A detection result of the environmental sensor device 268 is outputted to the terminal-side control system 261, which is used, in normal times, for surveillance of a traveling position so that the dump truck 20-1 may not deviate from the travel routes and for acceleration and deceleration, and is used, in emergencies, for braking operations required for urgent evasive actions.

The position calculating system 269 calculates the current position of the own vehicle based on the positioning radio waves from the navigation satellites 50-1, 50-2, and 50-3 (refer to FIG. 1).

Figure 3:
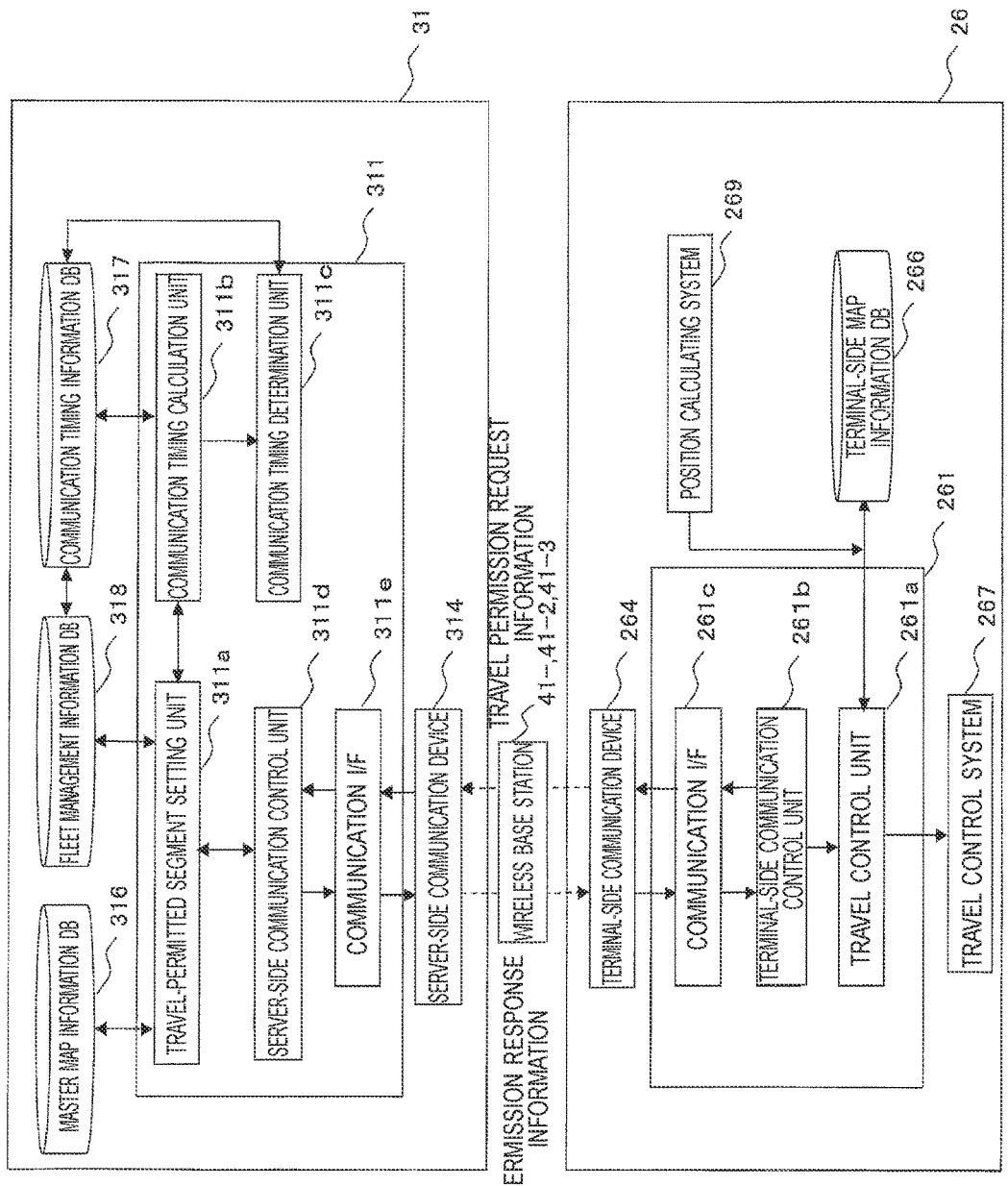
FIG. 3 is a functional block diagram showing main functions of the fleet management server and the on-board terminal equipment.

Next, by referring to FIG. 3, functional configurations of the fleet management server 31 and the on-board terminal equipment 26 of FIG. 1 are explained. FIG. 3 is a functional block diagram showing main functions of the fleet management server and the on-board terminal equipment.

As shown in FIG. 3, the server-side control system 311 of the fleet management server 31 has a travel-permitted segment setting unit 311a, a communication timing calculation unit 311b, a communication timing determination unit 311c, a server-side communication control unit 311d, and a communication interface (hereinafter, abbreviated as a "communication I/F") 311e.

The travel-permitted segment setting unit 311a refers to the map information of the master map information DB 316 and the fleet management information DB 318, sets the front boundary point at a point in front of the current position of the dump truck 20-1 on the travel routes 60 in response to a request from each dump truck 20-1, and temporarily sets the rear boundary point at a position located at the current position of the dump truck 20-1 or in front of it and also in rear of the front boundary point in the traveling direction.

Then, the travel routes 60 between the front boundary point and the rear boundary point that were temporarily set is temporarily set as a travel-permitted segment in which traveling is permitted to the dump truck 20-1 that issued the request.

Subsequently, on the basis of either of the temporarily set front boundary point or rear boundary point, a point separated from it by a predetermined distance is calculated as a point at which the dump truck 20-1 transmits the travel permission request information for requesting a next travel-permitted segment (hereinafter referred to as a "provisional permission-requesting point"). When a communication congestion factor of the wireless base station that is wireless connected when assuming that the travel permission request information is transmitted from a calculated provisional permission-requesting point is less than a predetermined threshold value, the temporarily set front boundary point, rear boundary point, and permission-requesting point are set.

The communication timing calculation unit 311b calculates a communication timing at which the permission request information is transmitted from the provisional permission-requesting point based on the traveling speed of the dump truck and the distance from the current position to the provisional permission-requesting point. The communication timing calculation unit 311b calculates (assumes) an arrival time to the provisional permission-requesting point, for example, by the following formula (1) on the premise that the dump truck 20-1 performs uniform movement. In this embodiment, this arrival time is considered as a communication timing of the permission request information.

$$t = t_0 + S_0/V_0 \qquad \text{(Formula 1)}$$

Where t: assumed arrival time to the temporarily set permission-requesting point,
$t_0$: current time,
$S_0$: distance from the current position to the temporarily set permission-requesting point, and
$V_0$: speed at which the dump truck travels at the current position.

The communication timing determination unit 311c refers to the fleet management information DB 317, and when the dump truck 20-1 in traveling transmits the permission request information from the provisional permission-requesting point that the travel-permitted segment setting unit 311a calculated, determines whether time differences between communication timings at which other dump trucks transmit the permission request information and the communication timing at which the dump truck 20-1 transmits the permission request information to the wireless base station serving as a wireless connection destination at a transmission time point of the wireless base station (more correctly at a time point when the wireless base station receives the permission request information) are more than or equal to the predetermined threshold value. The predetermined threshold value here is defined by time, and it is desirable that its length is specified to be a time interval of a degree to which collision of the permission request information transmitted to the same wireless base station does not occur and to be a time interval of a degree to which the timings of processing in the fleet control server do not overlap each other. When the time differences of the communication timings are more than or equal to the predetermined threshold value, the travel-permitted segment that incorporates the front boundary point and the rear boundary point being temporarily set as its end points is normally set by the travel-permitted segment setting unit 311a. The above-mentioned determination processing will be described later referring to FIG. 5.

The server-side communication control unit 311d performs control of receiving the permission request information of each dump truck 20-1 and transmitting the permission response information showing the travel-permitted segment being set in response to the permission request information. Incidentally, in a second embodiment that will be described later, control of transmitting the position information of the permission-requesting point further is performed.

The communication I/F 311e is configured with hardware for performing connection in communication with the server-side communication device 314, such as a connection terminal of USB (Universal Serial Bus) standard.

Next, the on-board terminal equipment 26 is explained. The terminal-side control system 261 of the on-board terminal equipment 26 has a travel control unit 261a, a terminal-side communication control unit 261b, and a communication I/F 261C.

The travel control unit 261a acquires the current position of the own vehicle from the position calculating system 269, and performs control for making the own vehicle travel in accordance with the travel-permitted segment included in the permission response information on the travel control system 267 by referring to map information of the terminal-side map information DB 266. Moreover, the travel control unit 261a determines existence of a forward obstacle based on the detection result of the environmental sensor device 268, also determines existence of interference with the obstacle and an evasion operation of collision, and performs control for a braking operation if necessary.

The Terminal-side communication control unit 261b performs control of transmitting the permission request information for requesting the next travel-permitted segment to the fleet management server 31 and receiving the permission response information from the fleet management server 31.

The communication I/F 261C is configured with hardware for communication connecting with the terminal-side communication device 264, such as a connection terminal of USB standard.

Figure 4A:
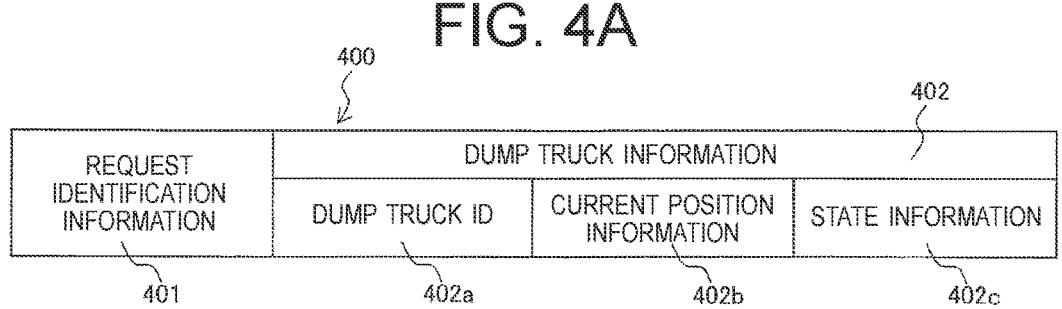
FIG. 4(a) shows a permission request information format that is transmitted from the dump truck to the fleet management server and FIG. 4(b) shows a permission response information format that is transmitted from the fleet management server to the dump truck.
Figure 4B:
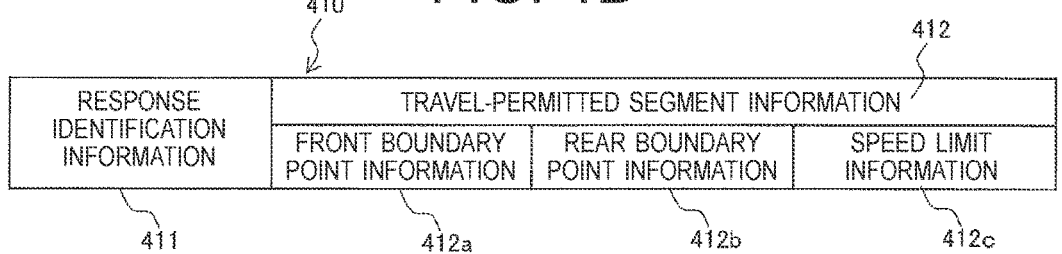

Next, based on FIG. 4, wireless communication processing between the fleet management server and an autonomous traveling dump truck is explained. FIG. 4 are a diagram showing a configuration of an information format transmitted/received between the fleet management server and the autonomous traveling damp truck, in which FIG. 4 (a) shows a permission request information format that is transmitted from the dump truck to the fleet management server and FIG. 4 (b) shows a permission response information format that is transmitted from the fleet management server to the dump truck.

As shown in (a) of FIG. 4, the permission request information format 400 includes request identification information 401 for inherently identifying the permission request information and dump truck information 402 of the dump truck having sent the permission request information. The dump truck information 402 includes dump truck ID 402a for inherently identifying the dump truck having transmitted the permission request information, current position information 402b showing a current position of the above-mentioned dump truck calculated based on the positioning radio wave, and the state information 402c showing a state of the dump truck, such as the traveling speed and tire air pressure.

Moreover, as shown in (b) of FIG. 4, the permission response information format 410 includes the response identification information 411 for uniquely identifying the response information, and the travel-permitted segment information 412 showing information about the travel-permitted segment. The response identification information 411 is information that enables to uniquely identify to which permission request information the response is given. Thereby, even in the case where broadcast transmission is performed from the fleet management server 31 through the wireless communication network 40, it is possible for each dump truck to receive response identification information 411 and to identify whether it is response information corresponding to the permission request information issued by the own vehicle.

The travel-permitted segment information 412 includes front boundary point information 412a, rear boundary point information 412b, and speed limit information 412c.

Next, the communication timing information stored in the fleet management information DB 317 that the fleet management server retains is explained referring to FIG. 5. FIG. 5 is a diagram showing the communication timing information.

A communication timing information table 500 shown in FIG. 5 is generated for every wireless base station. The communication timing information table 500 is one that, when a new travel-permitted segment is normally set, records information about the travel-permitted segment and a communication timing at which the permission request information is transmitted during traveling in the travel-permitted segment.

Specifically the communication timing information table 500 includes a "dump truck ID" field 501, a "front boundary point information" field 502, a "rear boundary point information" field 503, a "permission-requesting point information" field 504, a "speed limit" field 505, and an "assumed communication timing" field 506.

The travel routes 60 (refer to FIG. 1) where the dump truck 20-1 travels is configured with nodes on the travel routes and the sub links that connect adjacent nodes. The each node is correlated with point coordinates on one-to-one basis and the point on the travel route can be specified uniquely by specifying three-dimensional real coordinates or a node ID of the each point.

Then the "front boundary point information" field 502, the "rear boundary point information" field 503, and the "permission-requesting point information" field 504 are defined using the node ID. Among these, the "permission-requesting point information" field 504 registers a node ID at which the permission request information is scheduled to be sent.

The "assumed communication timing" field 506 registers a timing that the communication timing determination unit 311c calculated and at which the permission request information is transmitted from the permission-requesting point being set normally.

[Processing Operation and Effect]

Hereinafter, referring to FIG. 6, processing operations of the vehicle travel control system according to this embodiment are explained. FIG. 6 are diagrams showing setting processing of the travel-permitted segment in the vehicle travel control system according to this embodiment, in which FIG. 6 (a) shows a state of traveling a travel-permitted segment n, FIG. 6 (b) shows a state of having arrived at the permission-requesting point, FIG. 6 (c) shows a setting state of a release segment and a first front boundary point, and (d) shows a setting state of the next front boundary point.

As shown in (a) of FIG. 6, the travel routes 60 is defined including multiple points (nodes) 61 and at least one or more sub links 62. The travel-permitted segment is a segment that is given to each dump truck and allows the dump truck to perform the autonomous traveling. (a) of FIG. 6 shows the travel-permitted segment n including seven nodes 61 and six sub links 62 that connect the adjacent nodes 61. The travel-permitted segment n is defined, when the dump truck 20-1 transmits the permission request information during when traveling the travel-permitted segment n−1 (illustration is omitted) in a segment immediately before this, by the travel-permitted segment information (referring to the reference numeral 412 of (b) of FIG. 4) included in the permission response information transmitted from the fleet management server 31 in response to this.

In FIG. 6, the rear boundary point of the travel-permitted segment is represented by BP_bn, and the front boundary point thereof is represented by BP_fn. A permission-requesting segment is defined on the basis of the front boundary point BP_fn so as to extend to the fourth rear node from this point inclusive. Incidentally, a way of defining the permission-requesting segment is not limited to this, and may be defined on the basis of the rear boundary point. Moreover, a node that is located farthest to the rear in the permission-requesting segment is a point at which the dump truck 20-1 starts to transmit the permission request information, and is termed as the permission-requesting point (illustrated as RP in the diagram).

As shown in (b) of FIG. 6, when the dump truck 20-1 arrives at a permission-requesting point RP, it transmits information for requesting the next travel-permitted segment information (the permission request information) to the fleet management server 31 via any one of the wireless base stations (any one of 41-1, 41-2, and 41-3).

When the fleet management server 31 receives the permission request information, it performs the setting processing of the release segment shown in (c) of FIG. 6. The release segment is a segment that the fleet management server 31 has been set as the travel-permitted segment in response to the last travel permission request and is released to the other dump trucks so that they can be allowed to travel the segment. The fleet management server 31 sets the rear portion that starts from the node at which the dump truck 20-1 transmits the permission request information as the release segment.

Next, the fleet management server 31 sets the new travel-permitted segment. The fleet management server 31 sets the foremost end node in the release segment as a rear boundary point BP_bn+1 of a new travel-permitted segment n+1.

Moreover, it temporarily sets a front boundary point RP_f(n+1)' of the new travel-permitted segment n+1. Then the fleet management server 31 sets a provisional permission-requesting segment according to the predetermined conditions (in the above, on the basis of the front boundary point, a segment extending from this point inclusive to the forth rear node is designated as the permission-requesting segment) and calculates its rearmost end as a provisional permission-requesting point RP_f(n+1)'. Then it determines its communication congestion factor.

The "communication congestion factor" referred to here is expressed using a time difference between the communication timing of the dump truck 20-1 that is designated as a setting object of the travel-permitted segment and a communication timing that is closest to the communication timing of the dump truck 20-1 among the communication timings at which the other dump trucks transmit the permission request information to the wireless base station to which the dump truck 20-1 accesses when transmitting the permission request information. When the differences of this communication timing are less than the predetermined threshold value, it is determined that the communication timings of the dump truck 20-1 and the other dump trucks come near and communications are congested in the wireless base station. Moreover, when the differences of communication timings are more than or equal to the predetermined threshold value, it is determined that the communication timings of the dump truck 20-1 and other dump trucks are separated and the communications are not congested in the wireless base station.

The case where the differences of the communication timings are less than the predetermined threshold value means that the communications are congested in the wireless base station having a communication area that covers a provisional permission-requesting point RP_(n+1)', for example, 41-1 at a timing at which the dump truck 20-1 arrives at the provisional permission-requesting point RP_(n+1)' and transmits the permission request information. Therefore, the fleet management server 31 temporarily sets a point that is different from the temporarily set front boundary point RP_f(n+1)', in (d) of FIG. 6, a node in further front of RP_f(n+1)', as a front boundary point BP_fn+1 again.

Then the fleet management server determines the communication congestion factor of a provisional permission-requesting point RP_n+1 on the basis of the front boundary point BP_fn+1. As a result, if the differences of the communication timings with all the other dump trucks are more than or equal to the predetermined threshold value, the new travel-permitted segment n+1 that has the front boundary point BP_fn+1 as the foremost end is set. Its result is transmitted to the dump truck as the permission response information.

That is, in the above-mentioned permission response information, the "front boundary point information" 412a include the coordinates of the node BP_fn+1 and the "rear boundary point information" 412b include the node BP_bn+1 in the travel permission information format shown in (b) of FIG. 4. The speed limit 412c is defined according to a vehicle interval to the front vehicle and geographical features information.

Figure 7:
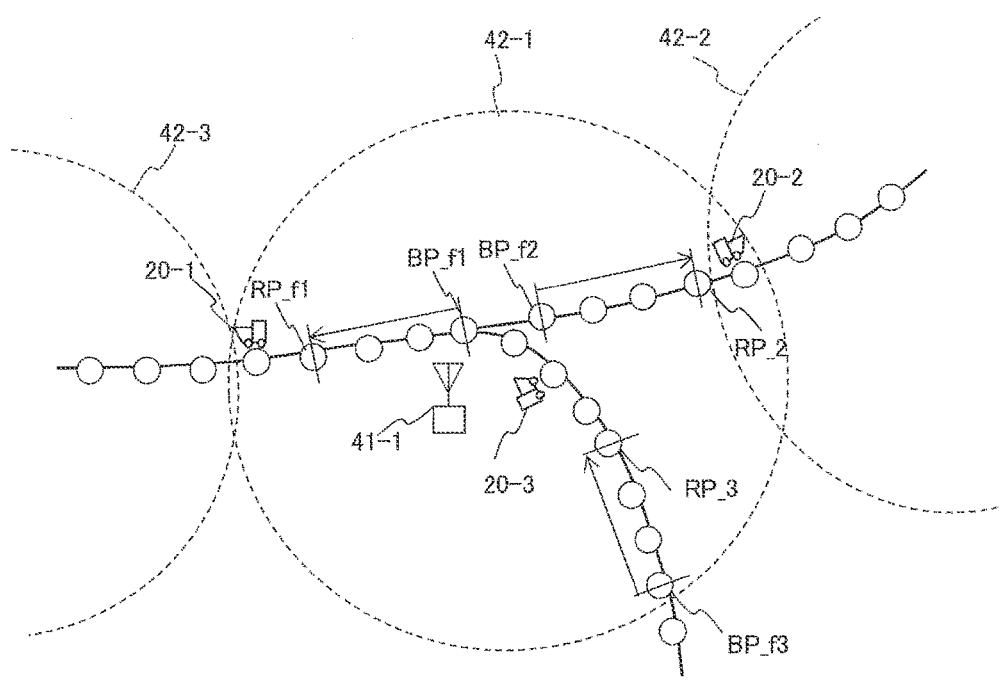
FIG. 7 is a diagram showing one example of a state where multiple dump trucks are located in the same communication area.
Figure 8A:
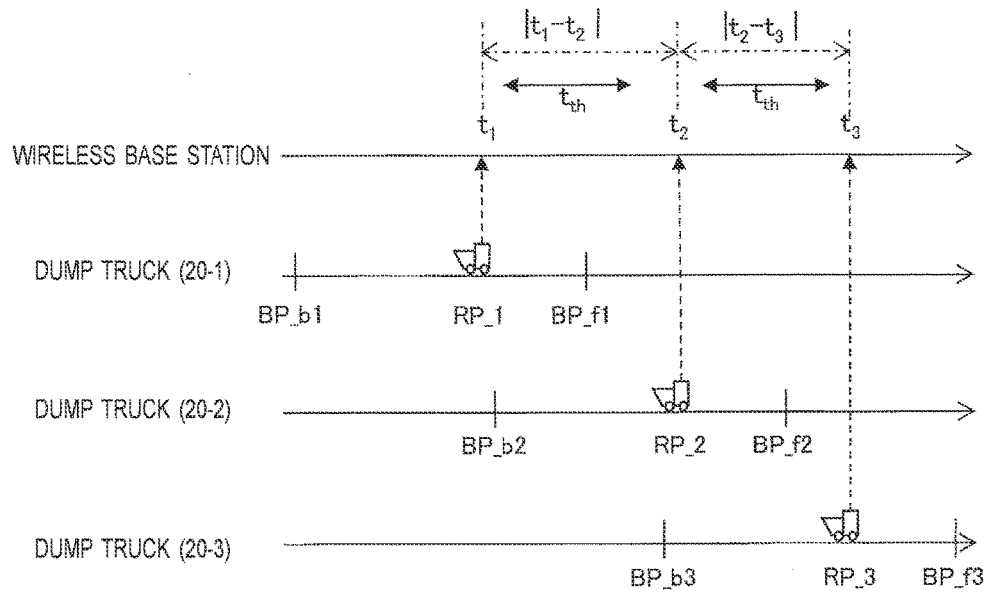
FIG. 8 show processing of setting the travel-permitted segment in consideration of the communication timing, in which FIG. 8 (a) shows a state where the travel-permitted segment is set without considering the communication timings in the multiple dump trucks and FIG. 8 (b) shows a state where the travel-permitted segment is set without considering the communication timings (by shifting the communication timings) in the multiple dump trucks.
Figure 8B:
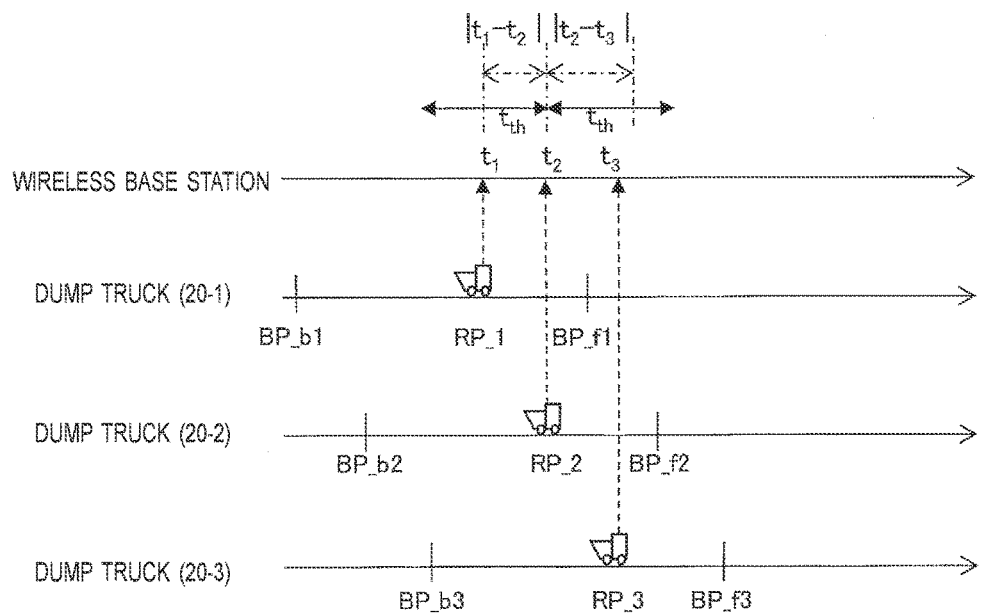
Figure 9:
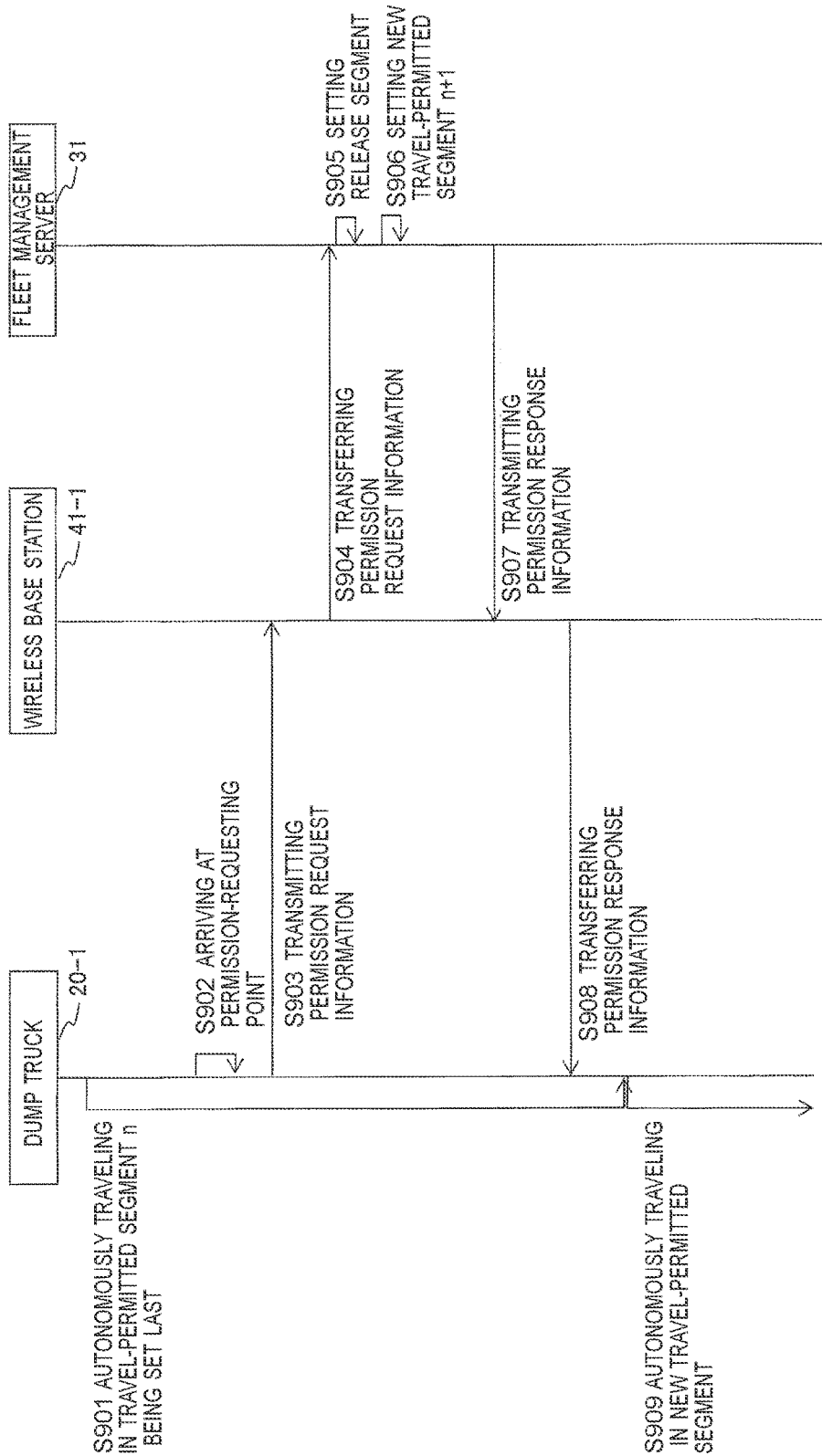
FIG. 9 is a sequence diagram showing a flow of the setting processing of the travel-permitted segment in the vehicle travel control system according to this embodiment.

Next, based on FIG. 7 to FIG. 9, a processing operation of deciding the travel-permitted segment shown in FIG. 6 in consideration of the communication timing is explained. FIG. 7 is a diagram showing one example of a state where multiple dump trucks are located in the same communication area. FIG. 8 show processing of setting the travel-permitted segment in consideration of communication timing, in which FIG. 8 (a) shows a state where the travel-permitted segment is set without considering the communication timing in the multiple dump trucks and FIG. 8 (b) shows a state where the travel-permitted segment is set without considering the communication timing (shifting communication timing) in the multiple dump trucks. FIG. 9 is a sequence diagram showing a flow of the setting processing of the travel-permitted segment in the vehicle travel control system according to this embodiment.

FIG. 7 assumes a situation where the wireless base station 41-1 transmits the radio wave to form a communication area 42-1 shown by a circle and three dump trucks 20-1, 20-2, and 20-3 are traveling in it. In FIG. 7, traveling directions (running directions) of the dump trucks 20-1, 20-2, and 20-3 are shown by forward- and backward-looking directions of figures representing the dump trucks 20-1, 20-2, and 20-3.

It is assumed that the travel-permitted segments whose front boundary points are designated as BP_f1, BP_f2, and BP_f3 are set for respective of the dump trucks 20-1, 20-2, and 20-3. In this case, nodes that are the forth rear nodes from the respective front boundary points BP_f1, BP_f2, and BP_f3 inclusive are designated as permission-requesting points RP_1, RP_2, and RP_3. In this embodiment, the travel-permitted segments of the respective dump trucks 20-1, 20-2, and 20-3 are set so that the communication timings at which the permission request information is transmitted to the wireless base station 41-1 from RP_1, RP_2, and RP_3 may be dispersed.

(a) of FIG. 8 shows a state where communication timing is dispersed. In (a) of FIG. 8, differences among the communication timing $t_1$ at which the dump truck 20-1 transmits the permission request information from the permission-requesting point RP_1, the communication timing $t_2$ at which the dump truck 20-2 transmits the permission request information from the permission-requesting point RP_2, and the communication timing $t_3$ at which the dump truck 20-3 transmits the permission request information from the permission-requesting point RP_3, $|t_1-t_2|$ and $|t_2-t_3|$ measure larger than a time threshold value $t_{th}$. This indicates that the communication timings at which the wireless base station 41-1 receives the permission request information from respective of the dump trucks 20-1, 20-2, and 20-3 are dispersed.

In contrast to this, in (b) of FIG. 8, $|t_1-t_2|$ and $|t_2-t_3|$ are shorter than the time threshold value $t_{th}$. Therefore, the communication timings at which the wireless base station 41-1 receives the permission request information from the respective of the dump trucks 20-1, 20-2, and 20-3 concentrate, which causes a state of collision of the communication and concentration of processing of the fleet management server 31.

In this embodiment, the permission-requesting point and the travel-permitted segment are set so that when the permission request information is transmitted to the same wireless base station from the multiple dump trucks, communication timings of this permission request information may be dispersed as in (a) of FIG. 8.

Next, along with a sequence of the steps of FIG. 9, a processing operation between the dump truck 20-1 and the management server 31 is explained.

The dump truck 20-1 performs the autonomous traveling in the travel-permitted segment n on which the fleet management server 31 made a response to the last travel permission request (S901).

When the dump truck 20-1 arrives at the permission-requesting point (S902), the dump truck 20-1 starts to transmit the permission request information to the fleet management server 31 (S903). More specifically, the terminal-side communication control unit 261b transmits the permission request information to the fleet management server 31 via the communication I/F 261C. Even after the transmission, the dump truck 20-1 continues traveling in the travel-permitted segment n.

The wireless base station 41-1 transfers the permission request information to the fleet management server 31 (S904).

The travel-permitted segment setting unit 311a sets a segment that is rear to a point shown by the current dump truck position information (refer to the reference numeral 402b in (a) of FIG. 4) included in the received permission request information as the release segment (S905). The seyment being set here as the release segment serves as a region in which the other dump trucks can travel.

Next, the travel-permitted segment setting unit 311a decides the new travel-permitted segment n+1 (S906). The details of this processing will be described later.

The server-side communication control unit 311d transmits information (the permission response information) showing the new travel-permitted segment n+1 to the dump truck 20-1 via the communication I/F 311e (S907) and the wireless base station 41-1 transfers the permission request information (S908).

The dump truck 20-1 receives the permission response information, and performs the autonomous traveling in the new travel-permitted segment n+1 (S909).

Figure 10:
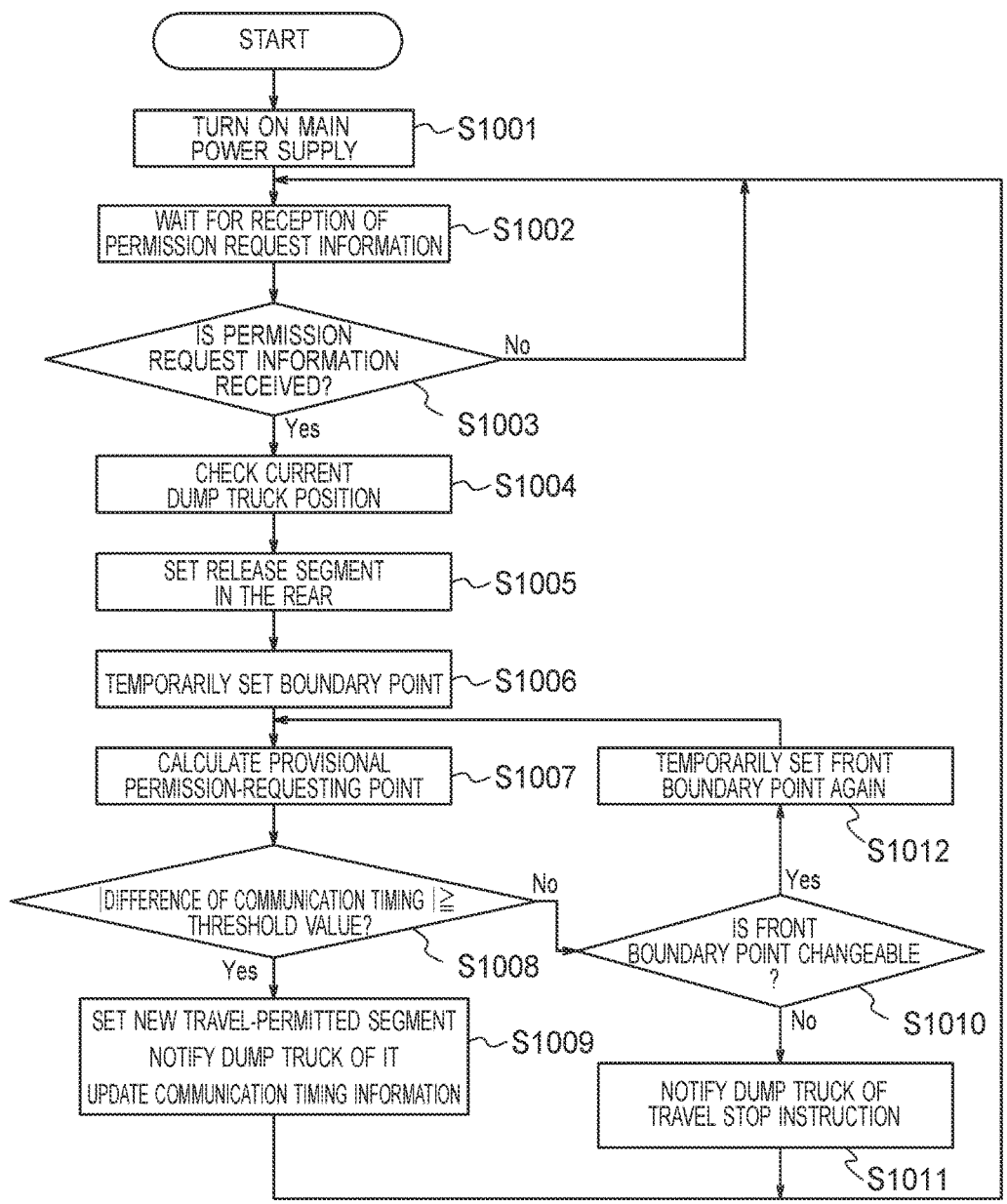
FIG. 10 is a flowchart showing a flow of the setting processing of the travel-permitted segment by the fleet management server.

Next, based on FIG. 10, processing of the fleet management server for realizing a series of processing described in FIG. 9 is explained. FIG. 10 is a flowchart showing a flow of the setting processing of the travel-permitted segment by the fleet management server.

The fleet management server 31 shifts to the reception waiting state of the permission request information coming from the dump truck 20-1 (S1002) after main power supply is turned on (S1001). When having received no permission request information (S1003/No), the flow returns to step S1002, where the fleet management server 31 continues to wait for reception of the permission request information.

Upon reception of the permission request information (S1003/Yes), the travel-permitted segment setting unit 311a checks the current dump truck position information included in the permission request information (S1004), and decides a rear release segment based on the current dump truck position information (S1005, corresponding to S905 of FIG. 9).

The travel-permitted segment setting unit 311a temporarily sets the boundary point of the new travel-permitted segment (S1006).

The rear boundary point is temporarily set using the foremost end of the release segment. Incidentally, "temporarily setting" used in this embodiment means a state until the point is ascertained to be used as a boundary point of the new travel-permitted segment, which does not care about existence/absence of change of the front boundary point, the rear boundary point, and the temporarily set permission-requesting point. Therefore, all of the front boundary point, the rear boundary point, and the permission-requesting point are in states being temporarily set until the new travel-permitted segment is set.

When the fleet management server 31 temporarily sets the front boundary point, it sets the front boundary point in a segment where other dump trucks are not traveling.

Next, the fleet management server 31 calculates the provisional permission-requesting segment that is calculated backward from the temporarily set boundary point and the permission-requesting point (S1007). In this embodiment, the provisional permission-requesting segment and the provisional permission-requesting point $RP\_(n+1)'$ are calculated on the basis of the front boundary point.

The communication timing determination unit 311b refers to the communication timing information table 500 stored in the fleet management information DB 317, checks whether the communication timing of the provisional permission-requesting point $RP\_(n+1)'$ has become a communication timing that is close to the communication timings of the other dump trucks already included in the communication timing information table 500, and when the communication timing of the provisional permission-requesting point $RP\_(n+1)'$ is away from any of the communication timings, that is, when the differences between all the communication timings at which the other dump trucks transmit the permission request information to the wireless base station that is a destination to which the permission request information is transmitted from the provisional permission-requesting point $RP\_(n+1)'$ and a communication timing at which the permission request information from the provisional permission-requesting point $RP\_(n+1)'$ are more than or equal to the predetermined threshold value (predetermined time difference) (S1008/Yes), normally sets a segment from the front boundary point $BP\_fn+1$ to the rear boundary point $BP\_bn+1$ that were temporarily set at step S1006 as a new travel-permitted segment n+1. Then the communication timing determination unit 311b notifies the dump truck of the position information of the new travel-permitted segment n+1 and the permission-requesting point (S1009).

When it is determined that at least one of the differences with the communication timings of the other dump trucks is less than the threshold value (S1008/No), the travel-permitted segment setting unit 311a checks whether the front boundary point is changeable, and if it is not changeable (S1010/No), the travel-permitted segment setting unit 311a transmits a stop instruction to the dump truck 20-1 (S1011).

When being changeable (S1010/Yes), the temporarily set front boundary point is changed into the front or the rear, and temporarily setting is performed again (S1012). At this time, it is more desirable to give priority to changing into the front. This makes it easy to suppress inconvenience that the dump truck 20-1 will pass through the front boundary point being temporarily set newly as a result of the dump truck 20-1 continuing to perform the autonomous traveling.

After this, the flow returns to step S1007, where the provisional permission-requesting point that is based on the front boundary point being temporarily set again is calculated again and the communication timing is evaluated (S1008).

By repeating the processing explained above, it is possible for the dump truck to perform wireless communication at a timing at which the wireless base station is not congested.

Figure 11:
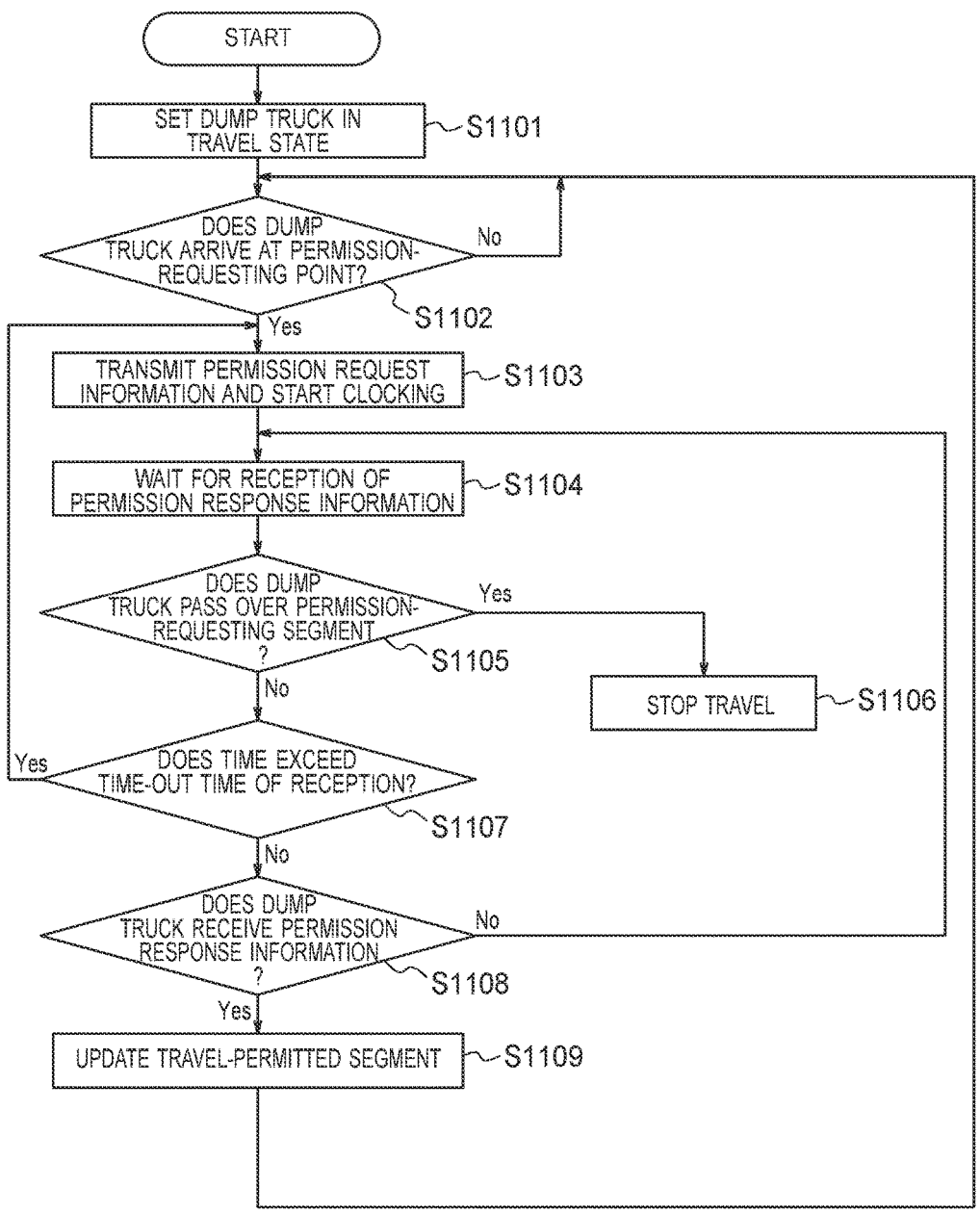
FIG. 11 is a flowchart showing a flow of travel control processing of the dump truck.

Next, based on FIG. 11, a flow of the processing on the dump truck side for realizing a series of processing described in FIG. 9 is explained. FIG. 11 is a flowchart showing a flow of a travel control processing of the dump truck.

During when the dump truck 20-1 is traveling in the travel-permitted segment decided by a last travel permission response (S1101), it always recognizes its own position by the position calculating system 269. Then the travel control unit 261a determines whether the current position arrives at the permission-requesting point (S1102). When it is recognized that the dump truck 20-1 has not arrived at the permission-requesting point (S1102/No), the flow returns to step S1102, where whether the permission-requesting point has been arrived continues to be determined.

If the travel control unit 261a determines that the dump truck 20-1 has arrived at the permission-requesting point (S1102/Yes), the communication control unit 261b transmits the permission request information to the fleet management server 31 (S1103). The communication control unit 261b starts measurement of elapsed time after transmitting the permission request information.

Then the communication control unit 261b waits for reception until the permission response information to the permission request information is transmitted from the fleet management server 31 (S1104).

Since the dump truck 20-1 is continuing the travel also in the meantime, the travel control unit 261a determines whether the current position has passed over the travel-permitted segment (S1105). Since if the current position of the dump truck 20-1 has passed over the travel-permitted segment (S1105/Yes), the dump truck 20-1 may collide with other dump trucks and therefore, the travel control unit 261a outputs a travel stop instruction to the travel control system 267 and the travel control system 267 controls a travel driving device for stopping the vehicle (S1106).

If the current position is in the travel-permitted segment (S1105/No), the dump truck 20-1 continues the autonomous traveling.

The communication control unit 261b also determines whether a waiting time for receiving the permission response information exceeded a time-out time being set in advance, and if it exceeded the time-out time (S1007/Yes), the flow returns to S1103 because there is a possibility that the permission request information may not have arrived at the fleet management server 31 for a certain reason, and the communication control unit 261b transmits the permission request information again. At this time, the communication control unit 261b also returns a value of a time counter to zero, and resumes clocking.

When the communication control unit 261b receives the permission response information (S1108/Yes) before the time-out time of reception (S1007/No), updating is performed to set the new travel-permitted segment based on the received information (S1109) and the dump truck continues to perform the autonomous traveling. If the communication control unit 261b does not receive travel permission response (S1108/No) before the time-out time of reception (S1107/No), the flow returns to step S1104, where the communication control unit 261b waits for reception of the permission response information.

According to this embodiment, it is possible to set the travel-permitted segment in consideration of the communication timing. This enables the autonomous traveling dump truck system for mine to resolve the communication congestion in the wireless base station, to achieve smooth operations of the dump trucks, and to mitigate concentration of processing of the fleet management server.

Moreover, in the wireless communication equipment in recent years, while it has become common to use general purpose articles that have been made into commodity as represented by Wi-Fi etc., there is a situation where functions of the wireless communication equipment are integrated into a single chip and are made into a black box. For this reason, while it becomes difficult to directly add a technical alteration to the wireless communication equipment, a technology of mastering well the wireless communication equipment that is made into the black box has become important.

Regarding this respect, since in this embodiment, the travel-permitted segment is set in consideration of the communication timing itself with no technical alteration added to the wireless communication equipment, it is possible to apply this invention to any wireless communication equipment regardless a communication method of the wireless communication equipment. Therefore, general purpose articles, such as Wi-Fi and IEEE compliant products, may be used, which lowers a cost as compared to a case where the technical alteration is added to the wireless communication equipment and a dedicated machine is used. In addition, even if wireless equipment that adopts a high-speed large-volume communication method emerges by a progress of the wireless technology, it is possible to exchange to new wireless communication equipment easily.

Furthermore, since this embodiment casts aside necessity of having a special configuration and control whereby each dump truck controls the communication timing, the embodiment comes with an advantage that a design of the dump truck becomes simple.

Second Embodiment

Although the boundary point of the travel-permitted segment was determined so that the communication timings of the multiple dump trucks may be dispersed in the first embodiment, in the second embodiment, the permission-requesting point is decided with the boundary point being fixed.

As a different point in configuration between the two embodiments, since in the first embodiment, the permission-requesting point is calculated based on predetermined conditions on the basis of either of the front boundary point or the rear boundary point in the travel permitted segment, although the fleet management server transmits the position information of the front boundary point or the rear boundary point, the information of the permission-requesting point does not need to be included in the wireless communication by the dump truck side calculating it. However, the second embodiment is different from the first embodiment in that the fleet management server needs to decide the permission-requesting point and transmit information indicating the position wirelessly. Since a hardware configuration and a functional block thereof are the same as those of the first embodiment, a duplicated explanation is omitted.

[System Configuration]

Figure 12:
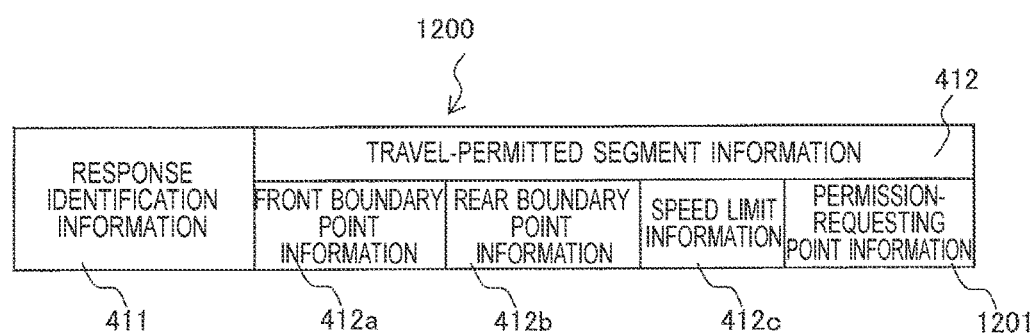
FIG. 12 is a diagram showing a configuration of the permission response information format according to a second embodiment.

Hereinbelow, a configuration of the vehicle travel control system according to the second embodiment is explained using FIG. 12. FIG. 12 is a diagram showing a configuration of the permission response information format according to the second embodiment.

FIG. 12 shows an example of the permission response information format that the fleet management server 31 transmits to the dump truck 20-1. The permission response information format 1200 includes information 1201 showing the permission-requesting point being set by the fleet management server 31 (hereinafter referred to as "permission-requesting point information") in addition to the configuration of the permission response information format 410 of the first embodiment. This enables the dump truck 20-1 to refer to the received travel permission information and to transmit the permission request information at a point shown by the permission-requesting point information included in this information.

[Processing Operation and Effect]

Figure 14:
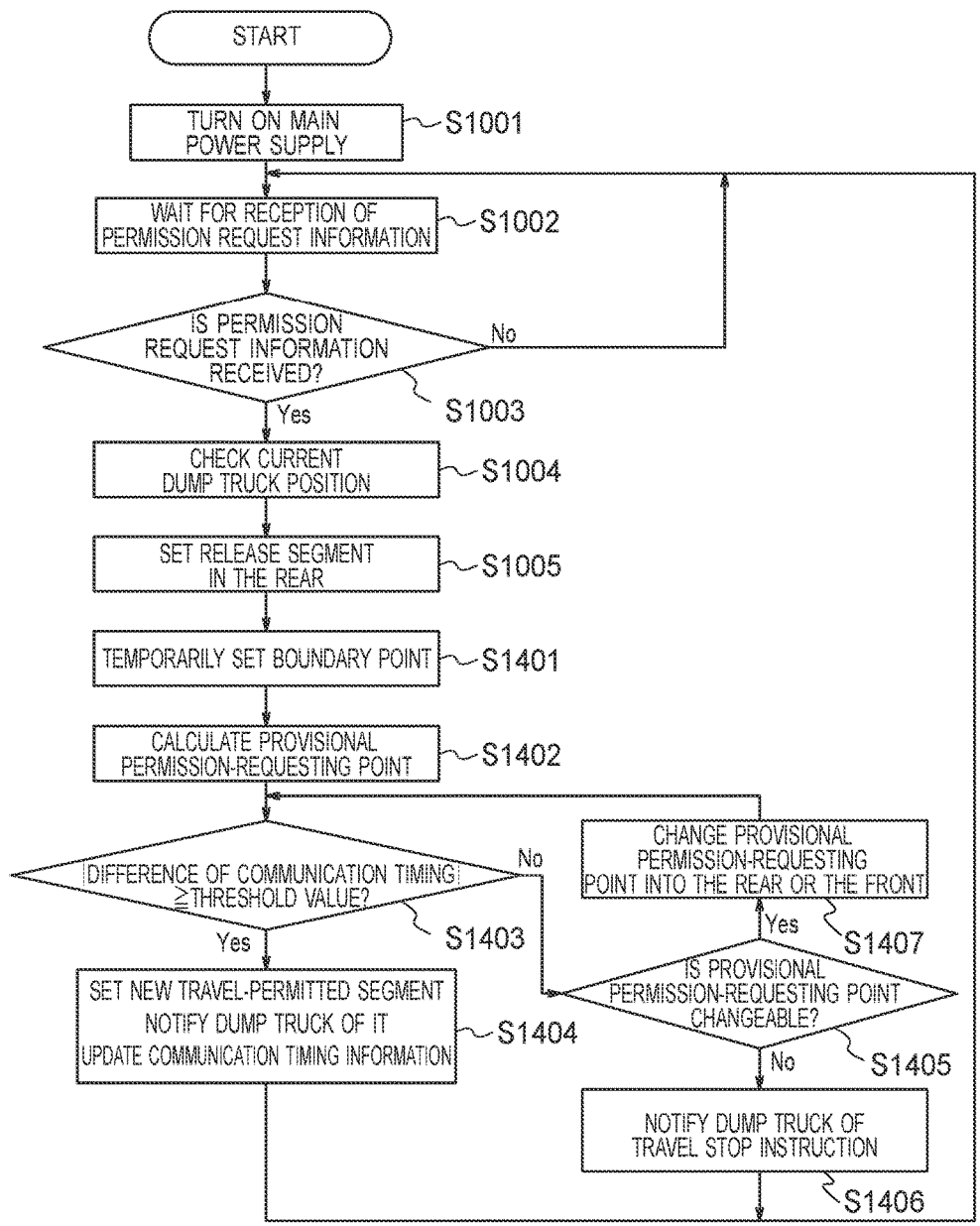
FIG. 14 is a flowchart showing a flow of the setting processing of the travel-permitted segment by the fleet management server according to the second embodiment.

Hereinafter, based on FIG. 13 and FIG. 14, processing operations according to the second embodiment are explained. FIG. 13 are diagrams showing the setting processing of the travel-permitted segment in the second embodiment, in which FIG. 13 (a) shows a case where the differences of the communication timings of the temporarily set permission-requesting point are less than the threshold value and FIG. 13 (b) shows a state where the differences of the communication timings of the permission-requesting point being temporarily set next are more than or equal to the threshold value. FIG. 14 is a flowchart showing a flow of the setting processing of the travel-permitted segment by the fleet management server according to the second embodiment.

As shown in (a) of FIG. 13, in this embodiment, first, the travel-permitted segment setting unit 311a temporarily sets the front boundary point BP_fn+1 of the new travel-permitted segment n+1. The rear boundary point BP_bn+1 is set at the node of the foremost end point of the release segment like the first embodiment.

Then the provisional permission-requesting point RP_(n+1)' is set on the basis of the front boundary point BP_fn+1. When the differences between the communication timing at which the dump truck 20-1 transmits the permission request information from the provisional permission-requesting point RP_(n+1)' and the communication timings at which the other dump trucks transmit the permission request information to the same wireless base station as that of the dump truck 20-1 are less than the predetermined threshold value, the new provisional permission-requesting point RP_n+1 (refer to (b) of FIG. 13) is set with the front boundary point being fixed.

When the differences between the communication timing at which the dump truck 20-1 transmits the permission request information at the provisional permission-requesting point RP_n+1 and the communication timings at which the other dump trucks transmit the permission request information to the same base station as that of the dump truck 20-1 are more than or equal to the predetermined threshold value, a partial segment that incorporates the temporarily set front boundary point BP_fn+1 as its front end part is normally set as the new travel-permitted segment.

Next, a processing operation of the fleet management server according to this embodiment is explained along a sequence of the steps of FIG. 14. Regarding the processing operation of the fleet management server according to this embodiment, since the processing from turning-on of the main power supply (step S1001 of FIG. 10) to setting of the release segment in the rear (step S1005 of FIG. 8) is the same as the travel-permitted segment decision processing of the fleet management server in the first embodiment, the step numbers of FIG. 10 are also used in FIG. 14 and duplicated explanations are omitted.

In this embodiment, when the travel segment setting unit 311a temporarily sets the front boundary point BP_fn+1 and the rear boundary point BP_bn+1 (S1401), the fleet management server calculates the provisional permission-requesting point RP_(n+1)' according to predetermined conditions on the basis of the front boundary point BP_fn+1 (S1402).

Whether the communication timing of the provisional permission-requesting point RP_(n+1)' becomes a communication timing close to the communication timing already contained in the communication timing information table is checked, and if it is separated from any of the communication timings, that is, if the differences between all the communication timings and the communication timing of the provisional permission-requesting point RP_(n+1)' are more than or equal to the predetermined threshold value (S1403/Yes), a segment from the front boundary point BP_fn+1 to the rear boundary point BP_bn+1 that were temporarily decided at step S1401 is normally set as the new travel-permitted segment n+1 and is informed to the dump truck (S1404). At this time, the position information of the permission-requesting point in the new travel-permitted segment n+1 is also notified together.

When the communication timing of a provisional permission-requesting point RP_(n+1) is close to the communication timings of the other dump trucks already included in the communication timing information table 500 (refer to FIG. 5), that is, when differences of the communication timings with at least one of the other dump trucks included in the communication timing information table 500 are less than the predetermined threshold value (S1403/No), it is checked whether the provisional permission point can be changed to another point (S1405), and if it cannot be changed (S1405/No), the travel stop instruction is transmitted to the dump truck (S1406).

When it can be changed (S1405/Yes), the provisional permission request point is changed into one that is in the rear or the front (S1407), and determination of the differences of the communication timings is performed again (S1403). By this series of processing, it is possible to set the permission-requesting point at a point at which the communication timing is good.

Since the processing of the dump truck side is the same as that of the first embodiment, a duplicated explanation is omitted.

According to this embodiment, without changing the boundary point of the travel-permitted segment, it is possible to set the travel-permitted segment with the communication timings of the multiple dump trucks dispersed. Accordingly, the communication congestion in the wireless base station can be eased and generation of collision can be suppressed, and therefore it is possible to improve wireless communications quality.

In addition, since it is not necessary to change the boundary point of the travel-permitted segment, this embodiment is especially effective in the case where another dump truck exists in the front segment and the boundary point of the travel-permitted segment cannot be changed for safety reasons, in the case where the travel-permitted segment is not desired to be changed just for increasing the dump trucks in number and thereby improving an availability factor, and in other cases.

Third Embodiment

[System Configuration]

Figure 15:
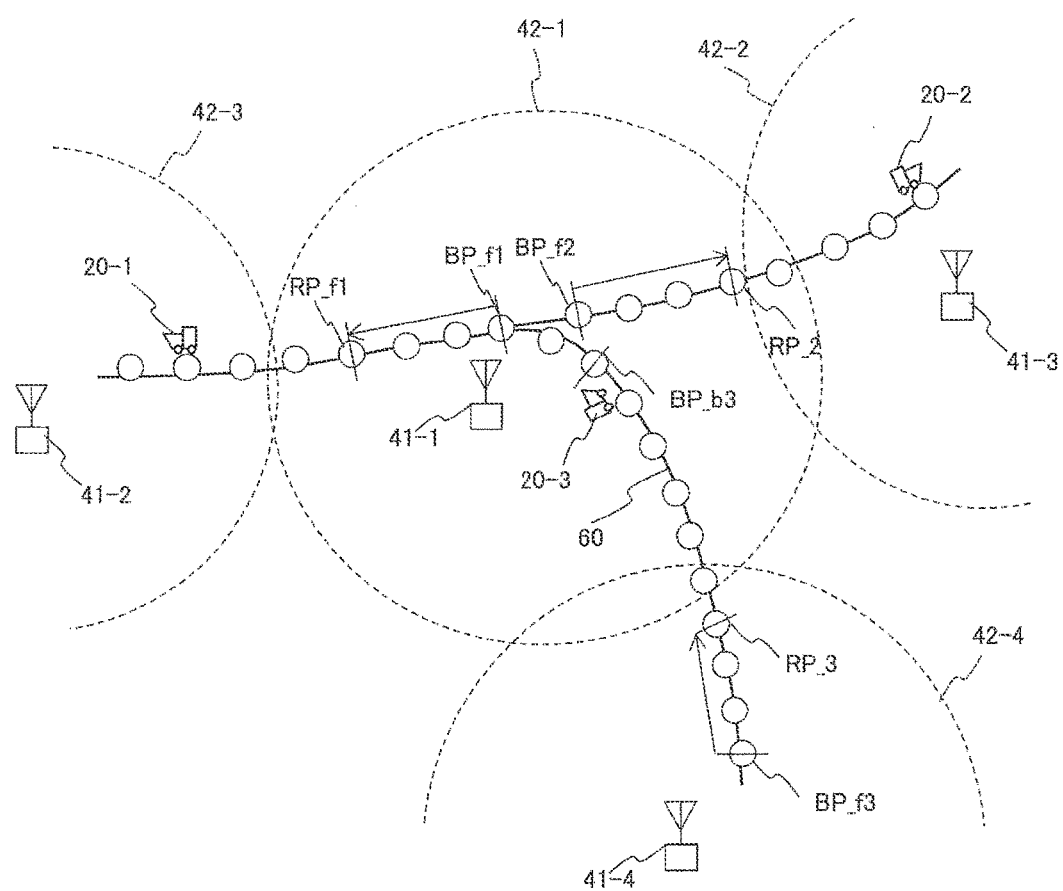
FIG. 15 is a diagram showing one example of a processing operation of managing the communication timing over the multiple ground stations in a third embodiment and deciding the travel-permitted segment.

Although the first embodiment was the embodiment in which the communication timing at one wireless base station is managed, this embodiment differs from it in that management of communication timings is performed over the multiple wireless base stations. Hereinbelow, a third embodiment is explained referring to FIG. 15 and FIG. 16. FIG. 15 is a diagram showing one example of a processing operation that manages communication timings over the multiple wireless base stations in the third embodiment and decides the travel-permitted seyment. FIG. 16 shows a configuration example of the communication timing information table that the fleet management server retains in the third embodiment. Since the hardware configuration and the functional block are the same as those of the first embodiment, duplicated explanations are omitted.

As shown in FIG. 15, this embodiment is different in that the wireless base stations 41-1, 41-2, 41-3, and 41-4 using the same frequency exist, and the multiple dump trucks 20-1, 20-2, and 20-3 that communicate with respective wireless base stations are made into a management object collectively.

The wireless base station 41-1 transmits the radio wave to form a wireless-communication area 42-1 shown by a circle. Similarly, the wireless base stations 41-2, 41-3, and 41-4 each form the wireless-communication areas 42-2 42-3, and 42-4 shown by circles. Moreover, the travel routes 60 consisting of the nodes and the sub links shall exist.

It is assumed that the dump truck 20-1 travels within a range of the wireless communication area 42-2, the dump truck 20-3 travels within a range of the wireless communication area 42-1, and the dump truck 20-3 travels within a range of the wireless communication area 42-2.

Here, regarding the travel-permitted segment 311a of the fleet management server 31, in the case where frequencies of adjacent wireless communication areas are the same, the boundary point of the travel-permitted segment is temporarily set so that the travel-permitted segment may span these wireless communication areas.

For example, suppose that frequencies of the wireless communication areas 42-1 and 42-4 are identical in FIG. 15. In this case, to the dump truck 20-3, the travel-permitted segment whose rear boundary point BP_b3 is in the wireless communication area 42-1 and whose front boundary point BP_f3 is in the wireless communication area 42-4 is temporarily set. Then according to predetermined conditions (for example, a point that is the fourth rear node from the front boundary point BP_f3 inclusive is designated as the provisional permission-requesting point), the provisional permission-requesting point RP_3 is calculated.

Since the provisional permission-requesting point RP_3 is a point in the wireless communication area 42-4 of the wireless base station 41-4, if the differences between all the communication timings at which the permission request information is transmitted to the wireless base station 41-4 from the other dump trucks are more than or equal to the predetermined threshold value, the travel-permitted segment that has the temporarily decided front boundary point BP_f3 as its foremost end is set.

[Processing Operation and Effect]

FIG. 16 shows a configuration example of the communication timing information table that the fleet management server retains in an example of this embodiment.

As shown in FIG. 16, the communication timing information table 1600 according to the third embodiment includes a "base station ID" field 1601 and a "frequency channel" field 1602 in addition to the communication timing information table 500 (refer to FIG. 5) already stated.

The base station ID is information for inherently identifying the wireless base stations 41-1, 41-2, 41-3, and 41-4, for example, a MAC Address (Media Access Control address) may be used for it.

The "frequency channel" indicates a frequency assigned to each base station. There is a case where adjacent wireless base stations (for example, wireless base station IDs of FIG. 16 are Yn−1 and Yn) may use the same frequency (1ch), and in this case, when the dump truck 20-1 travels between the communication areas of these adjacent wireless base stations (Yn−1, Yn), the dump truck 20-1 can perform the wireless communication without changing the frequency. Then, in the case like this, one travel-permitted segment is set over the multiple wireless base stations.

According to this embodiment, since the travel-permitted segment can be set with communication timings being dispersed over the wireless base stations of the same frequency, it is possible to make a degree of freedom larger when setting the travel-permitted segment. Moreover, since the number of times of transmitting the permission request information can be reduced in the whole travel routes by setting the travel-permitted segment to be longer, a probability that communication timings overlap becomes low.

Incidentally, the above-mentioned embodiments are exemplifications for explaining the present invention, and are not intended to limit a range of the present invention to the above-mentioned embodiments. A person skilled in the art can carry out the present invention in other various aspects within a range that does not deviate from a gist of the present invention.

For example, the above-mentioned second embodiment may be combined with the third embodiment.

Furthermore, in the above, although the rear boundary point was set at the foremost end point of the release segment, being not limited to this, the point may be set in further front of the foremost end point. Moreover, in the above, although the travel-permitted segment was explained as being between the front boundary point and the rear boundary point, the travel-permitted segment may be defined as being from the front boundary point to the current position of the dump truck. That is, the travel-permitted segment setting unit may set the travel-permitted segment whose rear portion is released and that specifies a marginal point of its advance. In this case, the provisional permission-requesting point is calculated on the basis of the front boundary point. Even in such an aspect, it is possible to realize the effect of the present invention by setting the front boundary point in consideration of wireless quality.

REFERENCE SIGNS LIST

1 Vehicle travel control system
10-1, 10-2 Excavator
20-1, 20-2 Dump truck
31 Fleet management server
40 Wireless communication network
41-1, 41-2, 41-3 Wireless base station
60 Travel routes
61 Node
62 Sub link

The invention claimed is:

1. A vehicle travel route control system comprising:
a plurality of haulage vehicles which travel along predetermined travel routes; and
a fleet management server which is wirelessly connected by one or more wireless base stations with the plurality of haulage vehicles and which controls movement of the plurality of haulage vehicles along the predetermined travel routes,
wherein each of the plurality of haulage vehicles includes a respective processor that is programmed to:

control movement of the respective haulage vehicle, and
calculate a current position of the respective haulage vehicle,
wherein the fleet management server includes a respective processor that is programmed to:
set, for each of the plurality of haulage vehicles, a partial segment on the predetermined travel routes as a travel-permitted segment where the respective haulage vehicle is permitted to travel, and
calculate, for each of the plurality of haulage vehicles, a permission-requesting point that is in the travel-permitted segment of the respective haulage vehicle and is a point to transmit permission request information for the respective haulage vehicle to request setting of a respective next travel-permitted segment located in front of the respective travel-permitted segment of the respective haulage vehicle,
calculate, for each of the plurality of haulage vehicles, a respective communication timing at which the permission request information is transmitted from the respective haulage vehicle to the fleet management server via the wireless base stations, and
determine whether a difference between the respective communication timing at which one haulage vehicle among the plurality of haulage vehicles transmits the permission request information and the respective communication timing at which another haulage vehicle among the plurality of haulage vehicles transmits the permission request information to a same one of the wireless base stations is more than or equal to a predetermined threshold value,
wherein the respective processor of the fleet management server is further programmed to:
temporarily set the travel-permitted segment for the one haulage vehicle, and calculate a provisional permission-requesting point corresponding to the temporarily-set travel-permitted segment for the one haulage vehicle,
calculate the respective communication timing at which the permission request information is transmitted from the provisional permission-requesting point by the one haulage vehicle,
determine whether the difference between the respective communication timing at which the one haulage vehicle transmits the permission request information from the provisional permission-requesting point and the respective communication timing at which the other haulage vehicle transmits the permission request information is more than or equal to the predetermined threshold value, and
set the temporarily-set travel-permitted segment as a normal travel-permitted segment for the one haulage vehicle when the difference of the respective communication timings is more than or equal to the predetermined threshold value, and
wherein the respective processor in each of the plurality of haulage vehicles is further programmed to:
control the movement of the respective haulage vehicle along the respective travel-permitted segment, and
stop the movement of the respective haulage vehicle when the current position of the respective haulage vehicle has passed over the respective travel-permitted segment.

2. The vehicle travel route control system according to claim 1, wherein the respective processor of the fleet management server is further programmed to:
temporarily set a front boundary point of the travel-permitted segment for the one haulage vehicle,
calculate the provisional permission-requesting point according to predetermined conditions on the basis of the front boundary point,
when the difference between the respective communication timing at which the one haulage vehicle transmits the permission request information from the provisional permission-requesting point and the respective communication timing at which the other haulage vehicle transmits the permission request information is less than the predetermined threshold value, temporarily set a point that is different from the temporarily-set front boundary point as a new front boundary point of the travel-permitted segment for the one haulage vehicle,
calculate a new provisional permission point according to the predetermined condition on the basis of the temporarily-set, new front boundary point, and
when the difference between a respective communication timing at which the one haulage vehicle transmits the permission request information from the new provisional permission-requesting point and the respective communication timing at which the other haulage vehicle transmits the permission request information is more than or equal to the predetermined threshold value, set the partial segment that incorporates the temporarily-set, new front boundary point as the front end part as the normal travel-permitted segment for the one haulage vehicle.

3. The vehicle travel route control system according to claim 1, wherein the respective processor of the fleet management server is further programmed to:
temporarily set a front boundary point and a rear boundary point of the travel-permitted segment for the one haulage vehicle,
calculate the provisional permission-requesting point on the basis of the temporarily-set front boundary point or the temporarily-set rear boundary point,
calculate a point between the temporarily-set front boundary point and the temporarily-set rear boundary point and is different from the provisional permission-requesting point as a new provisional permission-requesting point when the difference between the respective communication timing at which the one haulage vehicle transmits the permission request information from the provisional permission-requesting point and the respective communication timing at which the other haulage vehicle transmits the permission request information is less than the predetermined threshold value, and
sets a partial segment between the temporarily-set front boundary point and the temporarily-set rear boundary point as the normal travel-permitted segment when the difference between the respective communication timing at which the one haulage vehicle transmits the permission request information and the respective communication timing at which the other haulage vehicle transmits the permission request information is more than or equal to the predetermined threshold value.

4. The vehicle travel route control system according to claim 1, wherein the respective processor of the fleet management server is further programmed to: when adjacent ones of the wireless base stations use a same frequency, temporarily set, for at least the one haulage vehicle among the plurality of haulage vehicles, the travel-permitted segment to span communication areas of the adjacent ones of the wireless base stations.

5. The vehicle travel route control system according to claim 1, wherein the respective processor of the fleet management server is further programmed to:
calculate, for each of the plurality of haulage vehicles, the respective communication timing based on the current position and a traveling speed of the respective haulage vehicle.

6. The vehicle travel route control system according to claim 1, wherein the respective processor of the fleet management server is further programmed to:
instruct the one haulage vehicle to stop when the difference of the respective communication timings is less than the predetermined threshold value and the temporarily-set travel-permitted segment is unchangeable.

7. A fleet management server to control movement of a plurality of haulage vehicles traveling along predetermined travel routes via one or more wireless base stations, comprising:
a communication interface that is in wirelessly communication with the plurality of haulage vehicles via the one or more base stations; and
a processor connected with the communication interface and which is programmed to:
set, for each of the plurality of haulage vehicles, a predetermined partial segment on the travel routes as a travel-permitted segment where the respective haulage vehicle is permitted to travel t, and
calculate, for each of the plurality of haulage vehicles, a permission-requesting point that is in the travel-permitted segment of the respective haulage vehicle and is a point to transmit permission request information for the respective haulage vehicle to request setting of a respective next travel-permitted segment located in front of the respective travel-permitted segment of the respective haulage vehicle,
transmit, to each of the plurality of haulage vehicles, the respective travel-permitted segment and the respective permission-requesting point,
calculate, for each of the plurality of haulage vehicles, a respective communication timing at which the permission request information is transmitted from the respective haulage vehicle to the communication interface via the wireless base stations;
determine whether a difference between the respective timing at which one haulage vehicle among the plurality of haulage vehicles transmits the permission request information and the respective communication timing at which another haulage vehicle among the plurality of haulage vehicles transmits the permission request information to a same one of the wireless base stations is more than or equal to a predetermined threshold value; and wherein the respective processor of the fleet management server is further programmed to:
temporarily set the travel-permitted segment for the one haulage vehicle, and calculate a provisional permission-requesting point corresponding to the temporarily-set travel-permitted segment for the one haulage vehicle,
calculate the respective communication timing at which the permission request information is transmitted from the provisional permission-requesting point by the one haulage vehicle,
determine whether the difference between the respective communication timing at which the one haulage vehicle transmits the permission request information from the provisional permission-requesting point and the respective communication timing at which other haulage vehicle transmits the permission request information is more than or equal to the predetermined threshold value, and
set the temporarily-set travel-permitted segment as a normal travel-permitted segment for the one haulage vehicle when the difference of the respective communication timings is more than or equal to the predetermined threshold value,
wherein each of the plurality of haulage vehicles is configured to:
move along the respective travel-permitted segment, and
stop when a current position of the respective haulage vehicle has passed over the respective travel-permitted segment.

8. The fleet management server according to claim 7, wherein the processor is further programmed to:
instruct the one haulage vehicle to stop when the difference of the respective communication timings is less than the predetermined threshold value and the temporarily-set travel-permitted segment is unchangeable.

* * * * *